US006739772B2

(12) United States Patent
Suzuki et al.

(10) Patent No.: US 6,739,772 B2
(45) Date of Patent: May 25, 2004

(54) PRINTING METHOD AND APPARATUS

(75) Inventors: Kenichi Suzuki, Kanagawa (JP);
Kazumasa Matsumoto, Kanagawa (JP); Hidetomo Suwa, Tochigi (JP)

(73) Assignee: Canon Kabushiki Kaisha, Tokyo (JP)

( * ) Notice: Subject to any disclaimer, the term of this patent is extended or adjusted under 35 U.S.C. 154(b) by 131 days.

(21) Appl. No.: 09/939,785

(22) Filed: Aug. 28, 2001

(65) Prior Publication Data

US 2002/0081135 A1 Jun. 27, 2002

(30) Foreign Application Priority Data

Aug. 31, 2000 (JP) ........................................ 2000-264250
Aug. 3, 2001 (JP) ........................................ 2001-236902

(51) Int. Cl.$^7$ ................................................ B41J 3/42
(52) U.S. Cl. ............................ 400/70; 400/61; 400/62; 347/15
(58) Field of Search ............................ 400/70, 76, 61, 400/62; 347/15

(56) References Cited

U.S. PATENT DOCUMENTS

| | | | |
|---|---|---|---|
| 4,313,124 A | 1/1982 | Hara | 346/140 R |
| 4,345,262 A | 8/1982 | Shirato et al. | 346/140 R |
| 4,459,600 A | 7/1984 | Sato et al. | 346/140 R |
| 4,463,359 A | 7/1984 | Ayata et al. | 346/1.1 |
| 4,558,333 A | 12/1985 | Sugitani et al. | 346/140 R |
| 4,608,577 A | 8/1986 | Hori | 346/140 R |
| 4,723,129 A | 2/1988 | Endo | 346/1.1 |
| 4,740,796 A | 4/1988 | Endo et al. | 346/1.1 |
| 5,795,082 A * | 8/1998 | Shimada et al. | 400/120.09 |
| 6,079,824 A * | 6/2000 | Gotoh | 347/100 |
| 6,089,691 A * | 7/2000 | Kakutani | 347/15 |
| 6,164,747 A | 12/2000 | Yashima et al. | 347/15 |

FOREIGN PATENT DOCUMENTS

| | | | |
|---|---|---|---|
| EP | 0583 127 | 2/1994 | |
| EP | 0 850 767 | 7/1998 | |
| EP | 0 941 858 | 9/1999 | |
| EP | 0 970 814 | 1/2000 | |
| EP | 0 987 119 | 3/2000 | |
| JP | 54-056847 | 5/1979 | B41M/5/26 |
| JP | 59-123670 | 7/1984 | B41J/3/04 |
| JP | 59-138461 | 8/1984 | B41J/3/04 |
| JP | 60-071260 | 4/1985 | B41J/3/04 |
| JP | 10324002 | 12/1998 | B41J/002/205 |

* cited by examiner

Primary Examiner—Andrew H. Hirshfeld
Assistant Examiner—Minh Chau
(74) Attorney, Agent, or Firm—Fitzpatrick, Cella, Harper & Scinto

(57) ABSTRACT

When printing materials are supplied from a printhead, which is used to supply a plurality of types of printing materials having the same color and different densities on the basis of CD and printing OD value values obtained from image data, onto each pixel to print an image including a plurality of pixels expressed by combinations of the plurality of types of printing materials on a printing medium, a table storing pieces of ink information #1 to #8 representing combinations of inks in correspondence with pieces of address information $A_1$ to $A_{16}$ representing the positions of a plurality of pixels for the respective CD values ranging from 0 to 4096 with respect to the respective CD and OD values is looked up, combination information of inks to be used to print a target pixel is acquired on the basis of the CD and OD values and address information $A_1$ to $A_{16}$ of the target pixel, and the target pixel is printed by supplying inks from a printhead onto the target pixel on the basis of the combination information of inks.

30 Claims, 25 Drawing Sheets

FIG. 10A

| CD VALUE | $A_1$ | $A_2$ | $A_3$ | $A_4$ | $A_5$ | $A_6$ | $A_7$ | $A_8$ | $A_9$ | $A_{10}$ | $A_{11}$ | $A_{12}$ | $A_{13}$ | $A_{14}$ | $A_{15}$ | $A_{16}$ | $\alpha_1$ | $\alpha_2$ | $\alpha_3$ | $\alpha_4$ |
|---|---|---|---|---|---|---|---|---|---|---|---|---|---|---|---|---|---|---|---|---|
| 0 | 3.0720 #8 #8 #8 #8 | 3.0720 #8 #8 #8 #8 | 3.0720 #8 #8 #8 #8 | 3.0720 #8 #8 #8 #8 | 3.0720 #8 #8 #8 #8 | 3.0720 #8 #8 #8 #8 | 3.0720 #8 #8 #8 #8 | 3.0720 #8 #8 #8 #8 | 3.0720 #8 #8 #8 #8 | 3.0720 #8 #8 #8 #8 | 3.0720 #8 #8 #8 #8 | 3.0720 #8 #8 #8 #8 | 3.0720 #8 #8 #8 #8 | 3.0720 #8 #8 #8 #8 | 3.0720 #8 #8 #8 #8 | 3.0720 #8 #8 #8 #8 | 3.0720 | 3.0720 | 3.0720 | 3.0720 |
| ... | | | | | | | | | | | | | | | | | | | | |
| 3039 | 0.8040 #7 #7 #2 #1 | 0.8040 #7 #7 #2 #1 | 0.8040 #7 #7 #2 #1 | 0.8040 #7 #7 #2 #1 | 0.8040 #7 #7 #2 #1 | 0.7920 #7 #7 #1 #1 | 0.7920 #7 #7 #1 #1 | 0.7920 #7 #7 #1 #1 | 0.7920 #7 #7 #1 #1 | 0.7920 #7 #7 #1 #1 | 0.7920 #7 #7 #1 #1 | 0.7920 #7 #7 #1 #1 | 0.7800 #7 #6 #6 #1 | 0.7800 #7 #6 #6 #1 | 0.7800 #7 #6 #6 #1 | 0.7800 #7 #6 #6 #1 | 0.7950 | 0.7920 | 0.7920 | 0.7890 |
| 3040 | 0.8040 #7 #7 #2 #1 | 0.8040 #7 #7 #2 #1 | 0.8040 #7 #7 #2 #1 | 0.8040 #7 #7 #2 #1 | 0.8040 #7 #7 #2 #1 | 0.7920 #7 #7 #1 #1 | 0.7920 #7 #7 #1 #1 | 0.7920 #7 #7 #1 #1 | 0.7920 #7 #7 #1 #1 | 0.7920 #7 #7 #1 #1 | 0.7800 #7 #6 #6 #1 | 0.7800 #7 #6 #6 #1 | 0.7800 #7 #6 #6 #1 | 0.7800 #7 #6 #6 #1 | 0.7800 #7 #6 #6 #1 | 0.7800 #7 #6 #6 #1 | 0.7950 | 0.7920 | 0.7890 | 0.7890 |
| 3041 | 0.8040 #7 #7 #2 #1 | 0.8040 #7 #7 #2 #1 | 0.8040 #7 #7 #2 #1 | 0.8040 #7 #7 #2 #1 | 0.8040 #7 #7 #2 #1 | 0.7920 #7 #7 #1 #1 | 0.7920 #7 #7 #1 #1 | 0.7920 #7 #7 #1 #1 | 0.7800 #7 #6 #6 #1 | 0.7800 #7 #6 #6 #1 | 0.7800 #7 #6 #6 #1 | 0.7800 #7 #6 #6 #1 | 0.7800 #7 #6 #6 #1 | 0.7800 #7 #6 #6 #1 | 0.7800 #7 #6 #6 #1 | 0.7800 #7 #6 #6 #1 | 0.7950 | 0.7890 | 0.7890 | 0.7890 |
| 3042 | 0.8040 #7 #7 #2 #1 | 0.8040 #7 #7 #2 #1 | 0.8040 #7 #7 #2 #1 | 0.8040 #7 #7 #2 #1 | 0.8040 #7 #7 #2 #1 | 0.7920 #7 #7 #1 #1 | 0.7920 #7 #7 #1 #1 | 0.7800 #7 #6 #6 #1 | 0.7800 #7 #6 #6 #1 | 0.7800 #7 #6 #6 #1 | 0.7800 #7 #6 #6 #1 | 0.7800 #7 #6 #6 #1 | 0.7800 #7 #6 #6 #1 | 0.7800 #7 #6 #6 #1 | 0.7800 #7 #6 #6 #1 | 0.7800 #7 #6 #6 #1 | 0.7920 | 0.7890 | 0.7890 | 0.7890 |
| 3043 | 0.8040 #7 #7 #2 #1 | 0.8040 #7 #7 #2 #1 | 0.8040 #7 #7 #2 #1 | 0.8040 #7 #7 #2 #1 | 0.8040 #7 #7 #2 #1 | 0.7920 #7 #7 #1 #1 | 0.7800 #7 #6 #6 #1 | 0.7800 #7 #6 #6 #1 | 0.7800 #7 #6 #6 #1 | 0.7800 #7 #6 #6 #1 | 0.7800 #7 #6 #6 #1 | 0.7800 #7 #6 #6 #1 | 0.7800 #7 #6 #6 #1 | 0.7800 #7 #6 #6 #1 | 0.7800 #7 #6 #6 #1 | 0.7800 #7 #6 #6 #1 | 0.7920 | 0.7890 | 0.7890 | 0.7890 |
| 3044 | 0.8040 #7 #7 #2 #1 | 0.8040 #7 #7 #2 #1 | 0.8040 #7 #7 #2 #1 | 0.8040 #7 #7 #2 #1 | 0.8040 #7 #7 #2 #1 | 0.7800 #7 #6 #6 #1 | 0.7800 #7 #6 #6 #1 | 0.7800 #7 #6 #6 #1 | 0.7800 #7 #6 #6 #1 | 0.7800 #7 #6 #6 #1 | 0.7800 #7 #6 #6 #1 | 0.7800 #7 #6 #6 #1 | 0.7800 #7 #6 #6 #1 | 0.7800 #7 #6 #6 #1 | 0.7800 #7 #6 #6 #1 | 0.7800 #7 #6 #6 #1 | 0.7920 | 0.7890 | 0.7860 | 0.7860 |
| ... | | | | | | | | | | | | | | | | | | | | |

FIG. 10B

| CD VALUE | $A_1$ | $A_2$ | $A_3$ | $A_4$ | $A_5$ | $A_6$ | $A_7$ | $A_8$ | $A_9$ | $A_{10}$ | $A_{11}$ | $A_{12}$ | $A_{13}$ | $A_{14}$ | $A_{15}$ | $A_{16}$ | $\alpha_1$ | $\alpha_2$ | $\alpha_3$ | $\alpha_4$ |
|---|---|---|---|---|---|---|---|---|---|---|---|---|---|---|---|---|---|---|---|---|
| 4087 | 0.0120 #1 XXXX | 0.0120 #1 XXXX | 0.0120 #1 XXXX | 0.0120 #1 XXXX | 0.0120 #1 XXXX | 0.0120 #1 XXXX | 0.0120 #1 XXXX | 0.0120 #1 XXXX | 0.0000 XXXX | 0.0000 XXXX | 0.0000 XXXX | 0.0000 XXXX | 0.0000 XXXX | 0.0000 XXXX | 0.0000 XXXX | 0.0000 XXXX | 0.0060 | 0.0060 | 0.0060 | 0.0060 |
| 4088 | 0.0120 #1 XXXX | 0.0120 #1 XXXX | 0.0120 #1 XXXX | 0.0120 #1 XXXX | 0.0120 #1 XXXX | 0.0120 #1 XXXX | 0.0120 #1 XXXX | 0.0000 XXXX | 0.0000 XXXX | 0.0000 XXXX | 0.0000 XXXX | 0.0000 XXXX | 0.0000 XXXX | 0.0000 XXXX | 0.0000 XXXX | 0.0000 XXXX | 0.0060 | 0.0060 | 0.0060 | 0.0030 |
| 4089 | 0.0120 #1 XXXX | 0.0120 #1 XXXX | 0.0120 #1 XXXX | 0.0120 #1 XXXX | 0.0120 #1 XXXX | 0.0120 #1 XXXX | 0.0120 #1 XXXX | 0.0000 XXXX | 0.0000 XXXX | 0.0000 XXXX | 0.0000 XXXX | 0.0000 XXXX | 0.0000 XXXX | 0.0000 XXXX | 0.0000 XXXX | 0.0000 XXXX | 0.0060 | 0.0060 | 0.0030 | 0.0030 |
| 4090 | 0.0120 #1 XXXX | 0.0120 #1 XXXX | 0.0120 #1 XXXX | 0.0120 #1 XXXX | 0.0120 #1 XXXX | 0.0120 #1 XXXX | 0.0000 XXXX | 0.0000 XXXX | 0.0000 XXXX | 0.0000 XXXX | 0.0000 XXXX | 0.0000 XXXX | 0.0000 XXXX | 0.0000 XXXX | 0.0000 XXXX | 0.0000 XXXX | 0.0060 | 0.0060 | 0.0030 | 0.0030 |
| 4091 | 0.0120 #1 XXXX | 0.0120 #1 XXXX | 0.0120 #1 XXXX | 0.0120 #1 XXXX | 0.0120 #1 XXXX | 0.0120 #1 XXXX | 0.0000 XXXX | 0.0000 XXXX | 0.0000 XXXX | 0.0000 XXXX | 0.0000 XXXX | 0.0000 XXXX | 0.0000 XXXX | 0.0000 XXXX | 0.0000 XXXX | 0.0000 XXXX | 0.0060 | 0.0030 | 0.0030 | 0.0000 |
| 4092 | 0.0120 #1 XXXX | 0.0120 #1 XXXX | 0.0120 #1 XXXX | 0.0120 #1 XXXX | 0.0120 #1 XXXX | 0.0000 XXXX | 0.0000 XXXX | 0.0000 XXXX | 0.0000 XXXX | 0.0000 XXXX | 0.0000 XXXX | 0.0000 XXXX | 0.0000 XXXX | 0.0000 XXXX | 0.0000 XXXX | 0.0000 XXXX | 0.0030 | 0.0030 | 0.0030 | 0.0000 |
| 4093 | 0.0120 #1 XXXX | 0.0120 #1 XXXX | 0.0120 #1 XXXX | 0.0000 XXXX | 0.0000 XXXX | 0.0000 XXXX | 0.0000 XXXX | 0.0000 XXXX | 0.0000 XXXX | 0.0000 XXXX | 0.0000 XXXX | 0.0000 XXXX | 0.0000 XXXX | 0.0000 XXXX | 0.0000 XXXX | 0.0000 XXXX | 0.0030 | 0.0030 | 0.0000 | 0.0000 |
| 4094 | 0.0120 #1 XXXX | 0.0000 #1 XXXX | 0.0000 XXXX | 0.0000 XXXX | 0.0000 XXXX | 0.0000 XXXX | 0.0000 XXXX | 0.0000 XXXX | 0.0000 XXXX | 0.0000 XXXX | 0.0000 XXXX | 0.0000 XXXX | 0.0000 XXXX | 0.0000 XXXX | 0.0000 XXXX | 0.0000 XXXX | 0.0030 | 0.0030 | 0.0000 | 0.0000 |
| 4095 | 0.0000 XXXX | 0.0000 XXXX | 0.0000 XXXX | 0.0000 XXXX | 0.0000 XXXX | 0.0000 XXXX | 0.0000 XXXX | 0.0000 XXXX | 0.0000 XXXX | 0.0000 XXXX | 0.0000 XXXX | 0.0000 XXXX | 0.0000 XXXX | 0.0000 XXXX | 0.0000 XXXX | 0.0000 XXXX | 0.0000 | 0.0000 | 0.0000 | 0.0000 |

FIG. 11

| PRINTING OD VALUE | A₁ | A₂ | A₃ | A₄ | A₅ | A₆ | A₇ | A₈ | A₉ | A₁₀ | A₁₁ | A₁₂ | A₁₃ | A₁₄ | A₁₅ | A₁₆ | α₁ | α₂ | α₃ | α₄ |
|---|---|---|---|---|---|---|---|---|---|---|---|---|---|---|---|---|---|---|---|---|
| 3.0720 | 3.0720 #8 #8 #8 #8 | 3.0720 #8 #8 #8 #8 | 3.0720 #8 #8 #8 #8 | 3.0720 #8 #8 #8 #8 | 3.0720 #8 #8 #8 #8 | 3.0720 #8 #8 #8 #8 | 3.0720 #8 #8 #8 #8 | 3.0720 #8 #8 #8 #8 | 3.0720 #8 #8 #8 #8 | 3.0720 #8 #8 #8 #8 | 3.0720 #8 #8 #8 #8 | 3.0720 #8 #8 #8 #8 | 3.0720 #8 #8 #8 #8 | 3.0720 #8 #8 #8 #8 | 3.0720 #8 #8 #8 #8 | 3.0720 #8 #8 #8 #8 | 12.2880 | 12.2880 | 12.2880 | 12.2880 |
| 0.7920 | 0.8160 #7 #7 #2 #2 | 0.8160 #7 #7 #2 #2 | 0.8160 #7 #7 #2 #2 | 0.7920 #7 #7 #2 X | 0.8160 #7 #7 #2 #2 | 0.7920 #7 #7 #2 X | 0.7920 #7 #7 #2 X | 0.7920 #7 #7 #2 X | 0.7920 #7 #6 #6 X | 0.7680 #7 #6 #6 X | 0.7680 #7 #6 #6 X | 0.7680 #7 #6 #6 X | 0.7680 #7 #6 #6 X | 0.7680 #7 #6 #6 X | 0.7920 #8 #8 #8 #8 | 0.7680 #7 #6 #6 X | 3.2160 | 3.1440 | 3.1920 | 3.1200 |
| 0.7905 | 0.8160 #7 #7 #2 #2 | 0.8160 #7 #7 #2 #2 | 0.8160 #7 #7 #2 #2 | 0.7920 #7 #7 #2 X | 0.8160 #7 #7 #2 #2 | 0.7920 #7 #7 #2 X | 0.7920 #7 #7 #2 X | 0.7920 #7 #6 #2 X | 0.7920 #7 #6 #6 X | 0.7680 #7 #6 #6 X | 0.7920 #7 #6 #6 X | 0.7680 #7 #6 #6 X | 0.7920 #7 #6 #6 X | 0.7680 #7 #6 #6 X | 0.7920 #7 #6 #6 X | 0.7680 #7 #6 #6 X | 3.2160 | 3.1440 | 3.1920 | 3.0960 |
| 0.7890 | 0.8160 #7 #7 #2 #2 | 0.7920 #7 #7 #2 X | 0.8160 #7 #7 #2 #2 | 0.7920 #7 #7 #2 X | 0.8160 #7 #7 #2 #2 | 0.7920 #7 #7 #2 X | 0.7680 #7 #6 #2 X | 0.7680 #7 #6 #2 X | 0.7920 #7 #6 #6 X | 0.7680 #7 #6 #6 X | 0.7920 #7 #6 #6 X | 0.7680 #7 #6 #6 X | 0.7920 #7 #6 #6 X | 0.7680 #7 #6 #6 X | 0.7920 #7 #6 #6 X | 0.7680 #7 #6 #6 X | 3.2160 | 3.1200 | 3.1920 | 3.0960 |
| 0.0060 | 0.0240 #2 XXX | 0.0240 #2 XXX | 0.0240 #2 XXX | 0.0240 #2 XXX | 0.0000 XXXX | 0.0000 XXXX | 0.0000 XXXX | 0.0000 XXXX | 0.0000 XXXX | 0.0000 XXXX | 0.0000 XXXX | 0.0000 XXXX | 0.0000 XXXX | 0.0000 XXXX | 0.0000 XXXX | 0.0000 XXXX | 0.0240 | 0.0240 | 0.0240 | 0.0240 |
| 0.0045 | 0.0240 #2 XXX | 0.0240 #2 XXX | 0.0240 #2 XXX | 0.0000 XXXX | 0.0000 XXXX | 0.0000 XXXX | 0.0000 XXXX | 0.0000 XXXX | 0.0000 XXXX | 0.0000 XXXX | 0.0000 XXXX | 0.0000 XXXX | 0.0000 XXXX | 0.0000 XXXX | 0.0000 XXXX | 0.0000 XXXX | 0.0240 | 0.0240 | 0.0240 | 0.0000 |
| 0.2500 | 2.0000 #2 XXX | 2.0000 #2 XXX | 0.0000 XXXX | 0.0000 XXXX | 0.0000 XXXX | 0.0000 XXXX | 0.0000 XXXX | 0.0000 XXXX | 0.0000 XXXX | 0.0000 XXXX | 0.0000 XXXX | 0.0000 XXXX | 0.0000 XXXX | 0.0000 XXXX | 0.0000 XXXX | 0.0000 XXXX | 2.0000 | 2.0000 | 0.0000 | 0.0000 |
| 0.1250 | 2.0000 #2 XXX | 0.0000 XXXX | 0.0000 XXXX | 0.0000 XXXX | 0.0000 XXXX | 0.0000 XXXX | 0.0000 XXXX | 0.0000 XXXX | 0.0000 XXXX | 0.0000 XXXX | 0.0000 XXXX | 0.0000 XXXX | 0.0000 XXXX | 0.0000 XXXX | 0.0000 XXXX | 0.0000 XXXX | 2.0000 | 0.0000 | 0.0000 | 0.0000 |
| 0.0000 | 0.0000 XXXX | 0.0000 XXXX | 0.0000 XXXX | 0.0000 XXXX | 0.0000 XXXX | 0.0000 XXXX | 0.0000 XXXX | 0.0000 XXXX | 0.0000 XXXX | 0.0000 XXXX | 0.0000 XXXX | 0.0000 XXXX | 0.0000 XXXX | 0.0000 XXXX | 0.0000 XXXX | 0.0000 XXXX | 0.0000 | 0.0000 | 0.0000 | 0.0000 |

| CD VALUE | PRINTING OD VALUE |
|---|---|
| 0 | 3.0720 |
| ... | |
| 3038 | 0.7920 |
| 3039 | 0.7920 |
| 3040 | 0.7905 |
| 3041 | 0.7905 |
| 3042 | 0.7890 |
| 3043 | 0.7890 |
| ... | |
| 4087 | 0.0060 |
| 4088 | 0.0045 |
| 4089 | 0.0045 |
| 4090 | 0.2500 |
| 4091 | 0.2500 |
| 4092 | 0.1250 |
| 4093 | 0.1250 |
| 4094 | 0.0000 |
| 4095 | 0.0000 |

FIG. 15

| PRINTING OD VALUE | A₁ | A₂ | A₃ | A₄ | A₅ | A₆ | A₇ | A₈ | A₉ | A₁₀ | A₁₁ | A₁₂ | A₁₃ | A₁₄ | A₁₅ | A₁₆ | $\alpha_1$ | $\alpha_2$ | $\alpha_3$ | $\alpha_4$ |
|---|---|---|---|---|---|---|---|---|---|---|---|---|---|---|---|---|---|---|---|---|
| 2.7728 | 2.7728 #8 #8 #8 #8 | 2.7728 #8 #8 #8 #8 | 2.7728 #8 #8 #8 #8 | 2.7728 #8 #8 #8 #8 | 2.7728 #8 #8 #8 #8 | 2.7728 #8 #8 #8 #8 | 2.7728 #8 #8 #8 #8 | 2.7728 #8 #8 #8 #8 | 2.7728 #8 #8 #8 #8 | 2.7728 #8 #8 #8 #8 | 2.7728 #8 #8 #8 #8 | 2.7728 #8 #8 #8 #8 | 2.7728 #8 #8 #8 #8 | 2.7728 #8 #8 #8 #8 | 2.7728 #8 #8 #8 #8 | 2.7728 #8 #8 #8 #8 | 11.0913 | 11.0913 | 11.0913 | 11.0913 |
| 0.6745 | 0.6933 #7 #7 #2 #2 | 0.6933 #7 #7 #2 #2 | 0.6933 #7 #7 #2 #2 | 0.6745 #7 #7 #2 X | 0.6933 #7 #7 #2 #2 | 0.6745 #7 #7 #2 X | 0.6745 #7 #7 #2 X | 0.6745 #7 #7 #2 X | 0.6745 #7 #6 #6 X | 0.6745 #7 #6 #6 X | 0.6745 #7 #6 #6 X | 0.6745 #7 #6 #6 X | 0.6745 #7 #6 #6 X | 0.6745 #7 #6 #6 X | 0.6745 #7 #6 #6 X | 0.6557 #7 #6 #6 X | 2.7358 | 2.6793 | 2.7170 | 2.6605 |
| 0.6734 | 0.6933 #7 #7 #2 #2 | 0.6933 #7 #7 #2 #2 | 0.6933 #7 #7 #2 #2 | 0.6745 #7 #7 #2 X | 0.6933 #7 #7 #2 #2 | 0.6745 #7 #7 #2 X | 0.6745 #7 #7 #2 X | 0.6557 #7 #7 #2 X | 0.6557 #7 #6 #6 X | 0.6557 #7 #6 #6 X | 0.6745 #7 #6 #6 #2 | 0.6557 #7 #6 #6 X | 0.6745 #7 #6 #6 #2 | 0.6557 #7 #6 #6 X | 0.6745 #7 #6 #6 #2 | 0.6557 #7 #6 #6 X | 2.7358 | 2.6793 | 2.7170 | 2.6416 |
| 0.6722 | 0.6933 #7 #7 #2 #2 | 0.6745 #7 #7 #2 X | 0.6933 #7 #7 #2 #2 | 0.6745 #7 #7 #2 X | 0.6933 #7 #7 #2 #2 | 0.6745 #7 #7 #2 X | 0.6745 #7 #7 #2 X | 0.6557 #7 #6 #6 X | 0.6745 #7 #6 #6 #2 | 0.6557 #7 #6 #6 X | 0.6745 #7 #6 #6 #2 | 0.6557 #7 #6 #6 X | 0.6745 #7 #6 #6 #2 | 0.6557 #7 #6 #6 X | 0.6745 #7 #6 #6 #2 | 0.6557 #7 #6 #6 X | 2.7358 | 2.6605 | 2.7170 | 2.6416 |
| 0.0056 | 0.0225 #2 X X X | 0.0225 #2 X X X | 0.0225 #2 X X X | 0.0225 #2 X X X | 0.0000 X X X X | 0.0000 X X X X | 0.0000 X X X X | 0.0000 X X X X | 0.0000 X X X X | 0.0000 X X X X | 0.0000 X X X X | 0.0000 X X X X | 0.0000 X X X X | 0.0000 X X X X | 0.0000 X X X X | 0.0000 X X X X | 0.0225 | 0.0225 | 0.0225 | 0.0225 |
| 0.0042 | 0.0225 #2 X X X | 0.0225 #2 X X X | 0.0225 #2 X X X | 0.0000 X X X X | 0.0000 X X X X | 0.0000 X X X X | 0.0000 X X X X | 0.0000 X X X X | 0.0000 X X X X | 0.0000 X X X X | 0.0000 X X X X | 0.0000 X X X X | 0.0000 X X X X | 0.0000 X X X X | 0.0000 X X X X | 0.0000 X X X X | 0.0225 | 0.0225 | 0.0225 | 0.0000 |
| 0.0028 | 0.0225 #2 X X X | 0.0225 #2 X X X | 0.0000 X X X X | 0.0000 X X X X | 0.0000 X X X X | 0.0000 X X X X | 0.0000 X X X X | 0.0000 X X X X | 0.0000 X X X X | 0.0000 X X X X | 0.0000 X X X X | 0.0000 X X X X | 0.0000 X X X X | 0.0000 X X X X | 0.0000 X X X X | 0.0000 X X X X | 0.0225 | 0.0225 | 0.0000 | 0.0000 |
| 0.0014 | 0.0225 #2 X X X | 0.0000 X X X X | 0.0000 X X X X | 0.0000 X X X X | 0.0000 X X X X | 0.0000 X X X X | 0.0000 X X X X | 0.0000 X X X X | 0.0000 X X X X | 0.0000 X X X X | 0.0000 X X X X | 0.0000 X X X X | 0.0000 X X X X | 0.0000 X X X X | 0.0000 X X X X | 0.0000 X X X X | 0.0225 | 0.0000 | 0.0000 | 0.0000 |
| 0.0000 | 0.0000 X X X X | 0.0000 X X X X | 0.0000 X X X X | 0.0000 X X X X | 0.0000 X X X X | 0.0000 X X X X | 0.0000 X X X X | 0.0000 X X X X | 0.0000 X X X X | 0.0000 X X X X | 0.0000 X X X X | 0.0000 X X X X | 0.0000 X X X X | 0.0000 X X X X | 0.0000 X X X X | 0.0000 X X X X | 0.0000 | 0.0000 | 0.0000 | 0.0000 |

| CD VALUE | PRINTING OD VALUE |
|---|---|
| 0 | 2.7728 |
| ... | |
| 3097 | 0.6745 |
| 3098 | 0.6745 |
| 3099 | 0.6734 |
| 3100 | 0.6734 |
| 3101 | 0.6722 |
| 3102 | 0.6722 |
| ... | |
| 4087 | 0.0056 |
| 4088 | 0.0042 |
| 4089 | 0.0042 |
| 4090 | 0.0028 |
| 4091 | 0.0028 |
| 4092 | 0.0014 |
| 4093 | 0.0014 |
| 4094 | 0.0000 |
| 4095 | 0.0000 |

FIG. 17A

BLOCK A

| $A_1$ | $A_9$ | $A_3$ | $A_{11}$ |
|---|---|---|---|
| $A_{13}$ | $A_5$ | $A_{15}$ | $A_7$ |
| $A_4$ | $A_{12}$ | $A_2$ | $A_{10}$ |
| $A_{16}$ | $A_8$ | $A_{14}$ | $A_6$ |

BLOCK B

| $B_1$ | $B_9$ | $B_3$ | $B_{11}$ |
|---|---|---|---|
| $B_{13}$ | $B_5$ | $B_{15}$ | $B_7$ |
| $B_4$ | $B_{12}$ | $B_2$ | $B_{10}$ |
| $B_{16}$ | $B_8$ | $B_{14}$ | $B_6$ |

| A | B | A | B |
|---|---|---|---|
| B | A | B | A |
| A | B | A | B |
| B | A | B | A |

| No | INK A | INK B | INK C | INK D | INK E | INK F | dl (i) | th (i) |
|---|---|---|---|---|---|---|---|---|
| 0 | ○ | ○ | ○ | ○ | × | × | 0.0 | |
| 1 | ○ | ○ | ○ | × | ○ | × | 137.6 | 68.8 |
| 2 | ○ | ○ | ○ | × | × | × | 276.8 | 209.6 |
| 3 | ○ | ○ | × | ○ | ○ | × | 414.4 | 345.6 |
| 4 | ○ | ○ | × | ○ | × | × | 553.6 | 486.4 |
| 5 | ○ | ○ | × | × | ○ | × | 691.2 | 622.4 |
| 6 | ○ | ○ | × | × | × | × | 830.4 | 761.6 |
| 7 | ○ | × | ○ | ○ | ○ | × | 968.0 | 899.2 |
| 8 | ○ | × | ○ | ○ | × | ○ | 1036.8 | 1003.2 |
| 9 | ○ | × | ○ | ○ | × | × | 1107.2 | 1072.0 |
| 10 | ○ | × | ○ | × | ○ | ○ | 1176.0 | 1140.8 |
| 11 | ○ | × | ○ | ○ | ○ | × | 1244.8 | 1209.6 |
| 12 | ○ | × | ○ | ○ | × | ○ | 1313.6 | 1280.0 |
| 13 | ○ | × | ○ | × | × | × | 1382.4 | 1348.8 |
| 14 | ○ | × | × | ○ | ○ | ○ | 1452.8 | 1417.6 |
| 15 | ○ | × | × | ○ | ○ | × | 1521.6 | 1486.4 |
| 16 | ○ | × | × | ○ | × | ○ | 1590.4 | 1555.2 |
| 17 | ○ | × | × | ○ | × | × | 1659.2 | 1625.6 |
| 18 | ○ | × | × | × | ○ | ○ | 1729.6 | 1694.4 |
| 19 | ○ | × | × | × | ○ | × | 1798.4 | 1763.2 |
| 20 | ○ | × | × | × | × | ○ | 1867.2 | 1832.0 |
| 21 | ○ | × | × | × | × | × | 1936.0 | 1902.4 |
| 22 | × | ○ | ○ | ○ | ○ | × | 2004.8 | 1971.2 |
| 23 | × | ○ | ○ | ○ | × | ○ | 2075.2 | 2040.0 |
| 24 | × | ○ | ○ | ○ | × | × | 2144.0 | 2108.8 |
| 25 | × | ○ | ○ | × | ○ | ○ | 2212.8 | 2177.6 |
| 26 | × | ○ | ○ | × | ○ | × | 2281.6 | 2248.0 |
| 27 | × | ○ | ○ | × | × | ○ | 2361.6 | 2316.8 |
| 28 | × | ○ | ○ | × | × | × | 2420.8 | 2385.6 |
| 29 | × | ○ | × | ○ | ○ | ○ | 2489.6 | 2454.4 |
| 30 | × | ○ | × | ○ | ○ | × | 2558.4 | 2524.8 |
| 31 | × | ○ | × | ○ | × | ○ | 2627.2 | 2593.6 |
| 32 | × | ○ | × | ○ | × | × | 2697.6 | 2662.4 |
| 33 | × | ○ | × | × | ○ | ○ | 2766.4 | 2731.2 |
| 34 | × | ○ | × | × | ○ | × | 2835.2 | 2800.0 |
| 35 | × | ○ | × | × | × | ○ | 290.40 | 2870.4 |
| 36 | × | ○ | × | × | × | × | 2974.4 | 2939.2 |
| 37 | × | × | ○ | ○ | ○ | ○ | 3043.2 | 3008.0 |
| 38 | × | × | ○ | ○ | ○ | × | 3112.0 | 3076.8 |
| 39 | × | × | ○ | ○ | × | ○ | 3180.8 | 3147.2 |
| 40 | × | × | ○ | ○ | × | × | 3249.6 | 3216.0 |
| 41 | × | × | ○ | × | ○ | ○ | 3320.0 | 3284.8 |
| 42 | × | × | ○ | × | ○ | × | 3388.8 | 3353.6 |
| 43 | × | × | ○ | × | × | ○ | 3457.6 | 3422.4 |
| 44 | × | × | ○ | × | × | × | 3526.4 | 3492.8 |
| 45 | × | × | × | ○ | ○ | ○ | 3596.8 | 3561.6 |
| 46 | × | × | × | ○ | ○ | × | 3665.6 | 3630.4 |
| 47 | × | × | × | ○ | × | ○ | 3734.4 | 3699.2 |
| 48 | × | × | × | ○ | × | × | 3803.2 | 3769.6 |
| 49 | × | × | × | × | ○ | ○ | 3872.0 | 3838.4 |
| 50 | × | × | × | × | ○ | × | 3942.4 | 3907.2 |
| 51 | × | × | × | × | × | ○ | 4011.2 | 3976.0 |
| 52 | × | × | × | × | × | × | 4080.0 | 4044.8 |
| ※ | ○ | ○ | ○ | × | × | ○ | 208.0 | 172.8 |
| ※ | ○ | ○ | × | ○ | × | ○ | 484.8 | 449.6 |
| ※ | ○ | ○ | × | × | ○ | ○ | 622.4 | 587.2 |
| ※ | ○ | ○ | × | × | × | ○ | 760.0 | 726.4 |

FIG. 21A

| f(i−2, j−1) ↓ B(i−2, j−1) | f(i−1, j−1) ↓ B(i−1, j−1) | f(i, j−1) ↓ B(i, j−1) | f(i+1, j−1) ↓ B(i+1, j−1) |
|---|---|---|---|
| f(i−2, j) ↓ B(i−2, j) | f(i−1, j) ↓ B(i−1, j) | f(i, j) | f(i+1, j) |
| f(i−2, j+1) | f(i−1, j+1) | f(i, j+1) | f(i+1, j+1) |

FIG. 21B

| − | − | * | 7 | 3 |
|---|---|---|---|---|
| 1 | 3 | 7 | 3 | 1 |
| 0 | 1 | 3 | 1 | 0 |
| 0 | 0 | 1 | 0 | 0 |

TOTAL : 31

PRINTING METHOD AND APPARATUS

BACKGROUND OF THE INVENTION

Field of the Invention

The present invention relates to a printing method and apparatus and, more particularly, to a printing method and apparatus which print multilevel grayscale images.

Among printers based on various printing schemes, some printers are designed to form texts and images on printing media by making printing materials adhere to the printing media. Of the printers based on such printing schemes, an ink-jet printing apparatus is a typical one. Recently, with advances in the performance of ink-jet printing apparatuses, images have been printed as well as texts.

A typical ink-jet printing apparatus uses an array of a plurality of orifices (nozzles) capable of discharging inks having the same color and density. Such arrays of nozzles are generally arranged for inks having the same color and different densities or inks having different colors, respectively. Some printing apparatuses can discharge inks having the same color and density while changing the discharge amount in several steps.

While a head having these nozzles is moved relative to a printing medium, ink is discharged from the nozzles, thereby printing an image.

As methods of moving a head relative to a printing medium, the following are practiced:

(i) A so-called swath printing scheme, in which nozzles are arranged substantially parallel in the X direction. While a printing medium is at rest, the printhead is moved in a direction (Y direction) perpendicular to the X direction, and printing is performed during this period. Thereafter, the printing medium is intermittently moved by a predetermined distance in the X direction. The printhead is then moved again in the Y direction. Subsequently, this operation is repeated to print.

(ii) A so-called full multi-printing method, in which nozzles are fixed to cover the entire width of a printing medium in the Y direction. Printing is performed while the printing medium is moved at a constant speed in the X direction.

When images are printed by these methods, a pixel is defined as a unit of an image. A pixel is not necessarily formed by one dot (a portion formed on a printing medium by discharging ink from one nozzle once) and may be formed by a plurality of dots. When each pixel is to be formed by a plurality of dots, dots may be overlaid and printed on substantially the same point or may be printed on adjacent points. In either case, overlaying operation is determined in accordance with a predetermined rule. Image data to be printed is subjected to enlargement interpolation, reduction, or the like by an image processing means to have an image size conforming to a printing apparatus. The color to be printed and its density are determined for each pixel in accordance with predetermined rules. Printing is then executed in accordance with this determination. As described above, since one pixel may be constituted by a plurality of dots, dots do not necessarily have the same density, and inks having different densities can be selected. If a head capable of changing the discharge amount is used, the discharge amount, i.e., the ink amount of a dot, may be changed as needed. Alternatively, these methods may be combined.

When an image is to be printed, halftoning such as dithering or error diffusion is used as a method of faithfully reproducing the gradation of image data. In dithering or error diffusion, by increasing the number of gray levels of one pixel, a larger number of gray levels can be expressed. Such a printing method is disclosed in detail, for example, in Japanese Patent Laid-Open No. 10-324002.

More specifically, nozzles capable of discharging inks having different densities are prepared for one color, and printing is selectively performed a plurality of number of times (to be referred to as overlaying hereinafter) for one pixel by using these nozzles within a predetermined limit, thereby increasing the number of gray levels or densities (printing OD values) that can be expressed on this pixel. Assume that nozzles capable of discharging inks having six different densities are prepared, and overlaying is to be performed four times or less with respect to one pixel based on 600 dpi. In this case, 50 gray levels or more can be expressed. If one pixel is constituted by 2×2 adjacent points and is to be formed by a total of 16 times or less of overlaying/printing, 200 gray levels or more can be expressed. Gradation may be expressed by changing the amount of ink discharged from each ink and changing the ink amount of each dot instead of preparing nozzles capable of discharging inks having different densities. Alternatively, gradation may be expressed by combining these methods.

In these cases, a rule that makes the density (desired OD value) of a pixel to be expressed correspond to an ink overlaying/printing method is determined in advance, and actual printing, i.e., which nozzles are used and when inks are discharged, is determined in accordance with this rule. Printing is then actually performed by a printing control means in accordance with this determination.

For example, the printing OD value of each pixel printed by using the respective inks is measured in advance, and a printing OD value obtained by overlaying is determined by this measurement value, thereby preparing a table in which the printing OD values of pixels corresponding to the respective overlay patterns are written. An overlay pattern corresponding to a printing OD value near a desired OD value of a pixel to be printed is selected. In error diffusion processing, the difference between the desired OD value of the pixel to be printed and the corresponding printing OD value in the table is obtained and is distributed as errors to adjacent pixels.

There are various kinds of images, and hence various characteristics are required for printers depending on applications and purposes. In designing various printers in accordance with the application purposes, it is preferable that printing characteristics be freely designed.

As an example of an image for which special printing characteristics are required, a medical image will be described below.

In some fields, e.g., the field of medical images, many monochrome images printed in monochrome are still used for the following reason. A monochrome image exhibits high human eye density resolution. Therefore, in a field in which high density resolution is required, the amount of information that can be recognized by a human is higher in a monochrome image than in a color image. It is known that a transmission type printing medium increases the human eye density resolution as compared with a reflection type printing medium. In general, the human eye density resolution with respect to a color image is about 8 bits, whereas that with respect to a monochrome transmission image is 10 to 11 bits. A medical X-ray photograph or CT/MRI image printed on a transmission medium is actually read up to the human eye resolution limit to provide information for diagnosis. As a printer for printing such a high-quality monochrome image, a laser imager is available, which irradiates a silver halide film with a laser beam modulated in accordance with an image signal, and developing the film, thereby obtaining an image on the film. In such a laser imager, an image is often printed with a density resolution of 12 bits in consideration of a certain margin. However, such a laser image is expensive. In addition, wet type developing processing is required, and hence problems arise in terms of waste liquid disposal, cumbersome maintenance, and the like. Although a dry silver halide type laser imager which develops by heating is available, the image quality is inferior to that in the wet type.

An apparatus based on the ink-jet scheme capable of expressing 50 density gray levels or more in 600 dpi is disclosed in Japanese Patent Laid-Open No. 10-324002, which can print a 256-level grayscale image by further performing error diffusion processing. This reference has exemplified 256-level grayscale printing. If input image data is 4096-level grayscale data instead of 256-level grayscale data, 4096-level grayscale printing can be performed.

Table 1 shows the inks used by the printhead in this reference. As shown in Table 1, six types of inks are used, i.e., inks A, B, C, D, E, and F in descending order of density. Table 1 also shows the dye densities (%) and transmission densities of the respective inks A to F. Note that each ink is made of a dye and solvent. The solvent contains various additives such as a surfactant and humectant. These additives are used to control the discharge characteristics of ink from a printhead and the absorption characteristics of ink on a printing medium.

TABLE 1

| Type | A | B | C | D | E | F |
|---|---|---|---|---|---|---|
| Dye Density | 3.88 | 2.00 | 1.00 | 0.50 | 0.25 | 0.125 |
| Transmission Density | 1.72 | 0.89 | 0.44 | 0.22 | 0.11 | 0.06 |

If these inks are used and the maximum number of types of inks that can be ejected on one pixel is set to 4, the number of gray levels that can be expressed by one pixel is 6+6C2+6C3+6C4+1=57. In Table 1, inks having dye density that inhibit a combination of inks having the same density are set. The density ratios of four types of ink dots on the low-density side are 1:2:4:8 in ascending order of density. An image is output by using 53 gray levels of these 57 gray levels. That is, as described above, input image data (4096 gray levels) is converted into 53-base image data to output an image. FIG. 19 shows the types of inks and combinations thereof which are used to express the respective gray levels (53 gray levels). Referring to FIG. 19, the No. column indicates each gray level. Each portion indicated by the symbol "✳" in FIG. 19 indicates an ink combination that is not used to make the density level difference at a low-density portion become smaller than that at a high-density portion. In each of the ink A to F columns, "O" indicates that the corresponding ink is discharged from the printhead, and "x" indicates that the ink is not discharged from the printhead. In addition, the dl[i] (i=0 to 52: integers) column indicates the ink density level that expresses each gray level. The th[i] (i=1 to 52: integers) indicates a threshold for determining input image data as data corresponding to a specific one of 53 gray levels. Note that a threshold is generally determined as an ink density level at a midpoint between an ink density level dl[k−1] and an ink density level dl[k].

In this case, a combination of ink types that indicates each gray level is combination data, and the ink density level determined on the basis of the combination data is ink density data.

A multilevel error diffusion processing unit performs multilevel error diffusion processing to convert input image data (4096 gray levels) into base-53 data by using 53 ink density levels (dl[0] to dl[52]) and 52 thresholds (th[1] to th[52]). As described above, in the multilevel error diffusion processing disclosed in the reference, a plurality of thresholds, 52 values in this case, are set to convert input image data into multilevel data. In this point, this error diffusion processing greatly differs from general error diffusion processing. In this case, input image data is converted into multilevel data by using multilevel error diffusion processing. However, this operation is not limited to this method. For example, input image data may be converted into multilevel data by using another multilevel conversion method such as the multilevel average density retention method, multilevel dither matrix method, or submatrix method.

A procedure for printing control on the ink-jet printing apparatus disclosed in the above reference will be described next with reference to the flow chart of FIG. 20.

FIG. 20 is a flow chart showing the procedure for printing control on the ink-jet printing apparatus disclosed in the above reference.

In step S1, data associated with inks to be used by a printhead, including ink density data and combination data, is stored in an ink density data/combination data unit.

In step S2, input image data is input, and multilevel error diffusion processing is performed for each pixel indicated by the input image data.

Multilevel error diffusion processing will be described in detail below with reference to FIGS. 21A and 21B.

FIGS. 21A and 21B are views showing the arrangement of input image data in the above reference and the arrangement of base-53 image data obtained after multilevel error diffusion processing. That is, FIGS. 21A and 21B show part of the arrangement of pixels in 4096 density data (0 (black) to 4095 (transparent)) of the respective pixels of the input image data.

Referring to FIG. 21A, f(i, j) represents the 4096-density data level of a pixel of interest (i, j) to be converted into multilevel (base-53) data. Each of pixels f(i−2, j−1) to (i−1, j) above the dashed line have already undergone conversion to multilevel (base-53) data, and B(i, j) represents density data (53 values "0", "137.6", . . . , "4011.2", "4080") obtained by converting the pixel of interest (i, j) into multilevel (base-53) data. After conversion of the pixel of interest (i, j) into multilevel (base-53) data, conversion to multilevel (base-53) data is sequentially performed for f(i, j+1), f(i, j+2), . . . .

First of all, the 4096-density data level f(i, j) of the pixel of interest (i, j) is compared with a threshold th[k] by $$th[k] \leq f(i, j) < th[k+1] \quad (1)$$

$$B(i, j) = dl[k] \quad (2)$$

A value k that satisfies relation (1) is then obtained, and the density data B(i, j) after conversion of the pixel of interest (i, j) into multilevel (base-53) data is determined according to equation (2).

Subsequently, an error err between the density data B(i, j) determined by the above conversion to multilevel data and the 4096-density data level f(i, j) before the conversion to multilevel data is calculated using the error diffusion matrix shown in FIG. 21B by:

$$err = f(i, j) - dl[k] \qquad (3)$$

The calculated error err is then diffused to other pixels by:

$$f(x, y) = f(x, y) + err \times M(x-i, y-j)/31 \qquad (4)$$

As described above, the error err is diffused to each pixel in accordance with an error diffusion matrix like the one shown in FIG. 21B. Thereafter, conversion to multilevel (base-53) data is performed in the same manner as described above by using a value f(i, j) containing the diffused error.

In step S3, ink discharge control data corresponding to the printhead is generated on the basis of the combination data shown in FIG. 19 which corresponds to the density data B(i, j) obtained by a data distribution unit by the conversion to multilevel (base-53) data. If, for example, the density data B(i, j)=1036.8, ink discharge control data is generated to discharge the inks A, C, D, and F.

In step S4, a printhead/paper feed control unit controls driving of the printhead and conveyance of the printing medium in accordance with the ink discharge control data, thereby forming a grayscale image.

According to the above reference, six ink-jet heads (256 nozzle match head) corresponding to 600 dpi are used to output a medical grayscale image (transmission).

As described above, according to the prior art disclosed in the above reference, a printhead capable of discharging a plurality of types of multi-density inks in the conveying direction (sub-scanning direction) of a printing medium is prepared, and at least one ink dot for forming an image is discharged from the head in forming an image. This makes it possible to increase the number of gray levels of an image to be printed by using an arrangement similar to that of the conventional printhead without forming any new printhead capable of discharging many types of inks. That is, a good grayscale image with a large number of gray levels can be obtained without at least greatly increasing the cost by, e.g., forming a new printhead.

When an X-ray image was actually printed by this scheme (4096 gray levels), high image quality was obtained. Depending on the types of images, however, several problems in terms of image quality have occurred as compared with the image quality obtained by a laser imager. An example of such problems will be described below.

FIG. 22 shows an example how a chest X-ray image is printed on a transparent film by this method. Reference numeral 100 denotes a film. According to a general X-ray photograph, on the shoulder portions, the density gradually changes. In this example, however, contours 101 appeared. Such a contour will be referred to as a pseudo contour to indicate that a contour appears on a portion on which no contour should appear. Such pseudo contours appeared on portions where the density gradually changed. If such pseudo contours appear, the quality of the image deteriorates, and image diagnosis as the essential purpose is adversely affected.

When the reasons for the occurrence of such pseudo contours were analyzed, the followings were found to be causes.

Consider a portion where the density gray level changes from 3043 to 2974 with reference to FIG. 19. On this portion, the combination indicated by No. 37 is mainly used first, and then the combination indicated by No. 36 is then mainly used. When the combinations indicated by Nos. 37 and 36 are compared, it is found that the types of inks used greatly differ; the inks C, D, E, and F are used according to No. 37, and the ink B is used according to No. 36.

Whether the combination indicated by No. 37 or the combination indicated by No. 36 is used is determined by the result of error diffusion processing. In general, on a portion where the gradation gradually changes, the combination does not necessarily switch to another combination gradually, but may switch abruptly.

Inks are mixed to obtain a density like the one indicated by Table 1. In practice, however, an error occurs. In addition, even if a correct value is obtained when inks are mixed, the value slightly changes with time due to evaporation or the like. According to experiments, a change of 2 to 3% can occur normally, and a change of about 5% may occur. If, for example, the density change is 3%, the transmission density becomes about 0.89×0.03=0.027 in the case of the ink B. Assume that when the combination indicated by No. 37 switches to the combination indicated by No. 36, the inks C, D, E, and F have correct values. Even in this case, if the ink B changes 3%, an error of 0.027 occurs in terms of transmission density. If, for example, the above switching occurs in 50% pixels in a given small area, an error of 0.0135 occurs in this area in terms of average density.

The human eye density resolution with respect to a transparent film is 10 bits or more, which is 0.003 in terms of transparent density. That is, a portion where no contour should exist is recognized as a contour if there is a density difference of 0.003 or more in this portion.

The value "0.0135" as the above density error is sufficiently large as compared with this numerical value "0.003". With this density error, a pseudo contour easily appears. In addition, nozzles vary in discharge amount. If the discharge amounts uniformly vary, since the number of nozzles is large, the overall variations become small owing to an averaging effect. If, however, the discharge amounts vary partially among chips, this also appears as a density error.

The following is another problem in terms of image quality.

According to the error diffusion scheme, if the minimum printing OD value is smaller than a desired OD value, no ink is ejected up to a certain threshold, and ink having the minimum printing OD value is ejected only when the threshold is reached. For this reason, on a portion where the density gradually increases from transparency, a phenomenon (sweep-out phenomenon) occurs, in which a transparent portion continues up to a certain point, and the density abruptly increases from this point.

In addition to the problems associated with image quality, a problem arises in error diffusion processing in terms of processing time. That is, a long processing time is required because calculation must be done for each pixel every time the image to be printed changes. When an error is to be diffused to neighboring pixels, in particular, many multiplications and divisions must be done. If the pixel size is reduced to 300 dpi or 600 dpi to obtain a high-resolution image, the processing time is prolonged due to a large number of pixels. In the case of medical images, in particular, since images are often printed on large-size films having a size of 14×17 inches, the above problem becomes serious.

The case where very high image quality is required has been described above. In some cases, however, high-speed printing may be required while the demand for image quality is not very high, and an inexpensive printer capable of printing high-quality may be required, which is realized by simplifying the mechanism.

SUMMARY OF THE INVENTION

The present invention has been made in consideration of the above problems, and has as its object to provide a printing method and apparatus which can easily change output characteristics in accordance with the purpose of a printed image and the like, and can print a high-quality image at high speed.

In order to solve the above problems and achieve the above object, according to the present invention, there is provided a printing apparatus for supplying printing materials from a printhead, which is used to supply a plurality of types of printing materials having the same color and different densities on the basis of density information values obtained from image data, onto each pixel to print an image including a plurality of pixels expressed by combinations of the plurality of types of printing materials on a printing medium, comprising a data storage unit storing data made to correspond to combination information representing a combination of the printing materials with respect to each address information representing a position of each of the plurality of pixels in each of the density information values, acquisition means for acquiring combination information of printing materials to be used to print a target pixel by looking up data stored in the data storage unit on the basis of a density information value and address information of the target pixel, and printing control means for printing the target pixel by supplying printing materials from the printhead onto the target pixel on the basis of the combination information acquired by the acquisition means.

In addition, there is provided a printing method of supplying printing materials from a printhead, which is used to supply a plurality of types of printing materials having the same color and different densities on the basis of density information values obtained from image data, onto each pixel to print an image including a plurality of pixels expressed by combinations of the plurality of types of printing materials on a printing medium, comprising the acquisition step of looking up a data storage unit storing data made to correspond to combination information representing a combination of the printing materials with respect to each address information representing a position of each of the plurality of pixels in each of the density information values, thereby acquiring combination information of printing materials to be used to print a target pixel on the basis of a density information value and address information of the target pixel, and the printing control step of printing the target pixel by supplying printing materials from the printhead onto the target pixel on the basis of the combination information acquired in the acquisition step.

Other objects and advantages besides those discussed above will be apparent to those skilled in the art from the description of the preferred embodiments of the invention which follows. In the description, reference is made to accompanying drawings, which form a part thereof, and which illustrate exemplary embodiments of the invention. Such examples, however, are not exhaustive of all the various embodiments of the invention, and therefore reference is made to the claims which follow the description for determining the scope of the invention.

BRIEF DESCRIPTION OF THE DRAWINGS

FIG. 10A is a view showing an overlay pattern distribution table in the first embodiment;

FIG. 10B is a view showing an overlay pattern distribution table in the first embodiment;

FIG. 11 is a view showing an overlay pattern distribution table in the second embodiment;

FIG. 15 is a view showing an overlay pattern distribution table in the third embodiment;

FIGS. 17A to 17C are views showing an example of how an image is divided into two blocks in the fourth embodiment;

FIG. 18A is a view showing an overlay pattern distribution table in the fourth embodiment;

FIG. 18B is a view showing an overlay pattern distribution table in the fourth embodiment;

FIG. 19 is a view showing a table storing the types of inks and combination of inks which are used to express each gray level (53 gray levels) when input image data (4096 gray levels) is to be output upon conversion into a base-53 image;

FIGS. 21A and 21B are views showing the arrangement of conventional input image data and the arrangement of base-53 image data obtained after multilevel error diffusion processing;

DETAILED DESCRIPTION OF THE PREFERRED EMBODIMENTS

Figure 1:
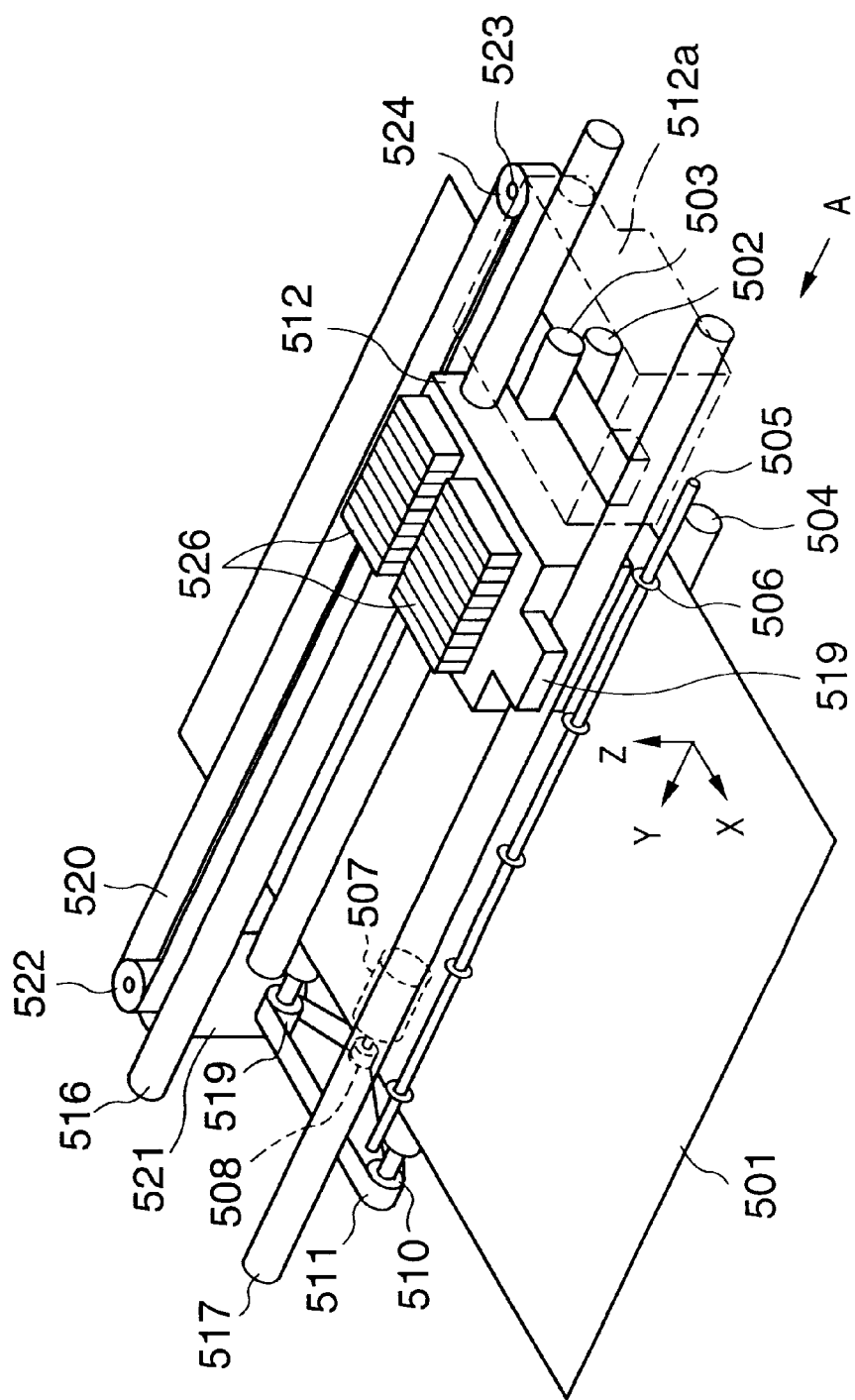
FIG. 1 is a perspective view showing the main part (printing unit) of an ink-jet printing apparatus according to an embodiment of the present invention.
Figure 2:
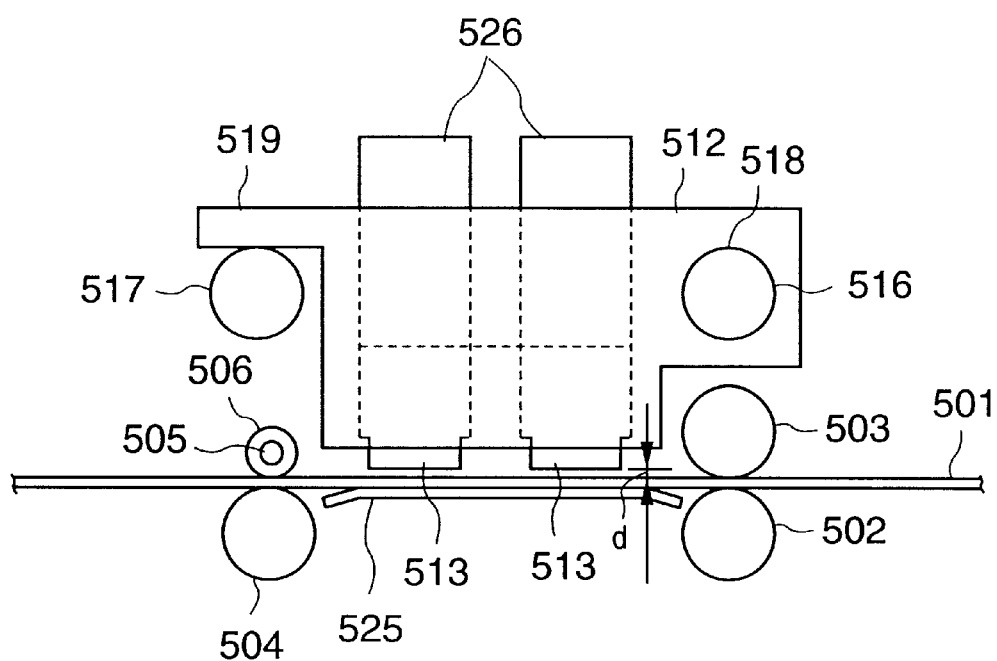
FIG. 2 is a side view showing the apparatus in FIG. 1 when viewed from a direction A.
Figure 3:
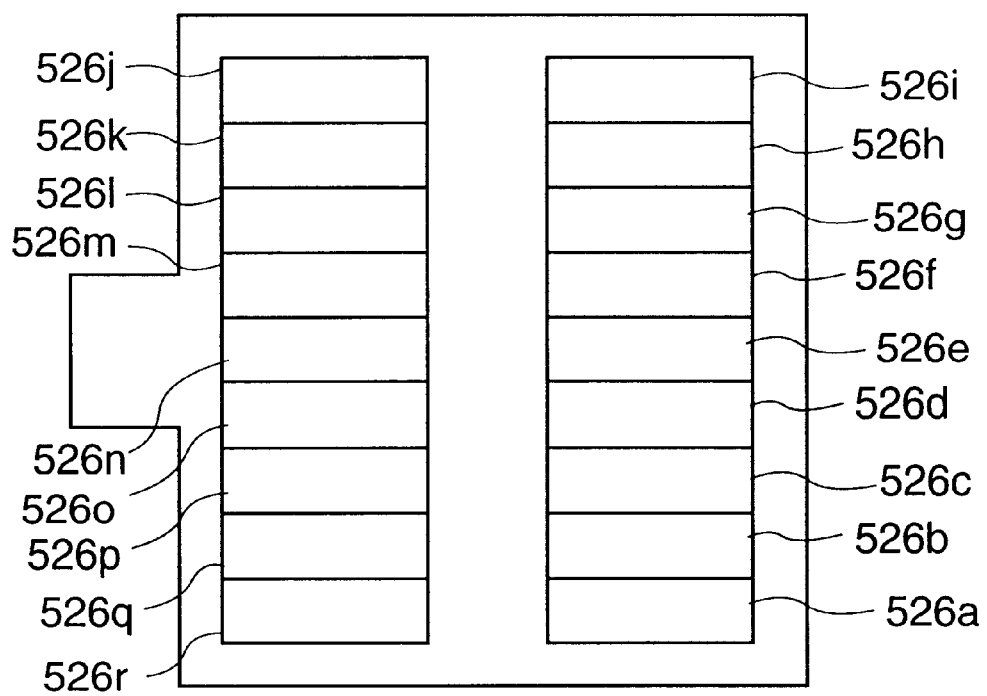
FIG. 3 is a view showing the details of a carriage when viewed from above.
Figure 4A:
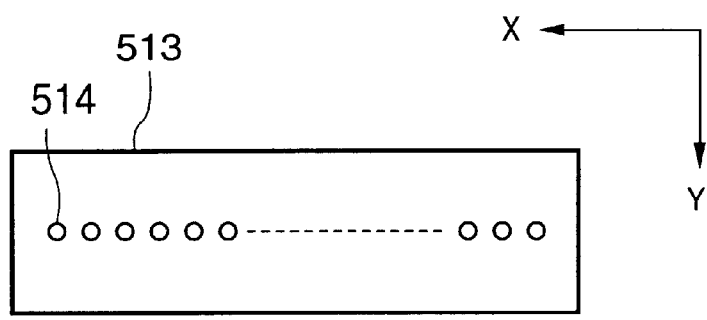
FIG. 4A is a view showing the details of part of a head when viewed from the lower side in FIG. 1.
Figure 4B:
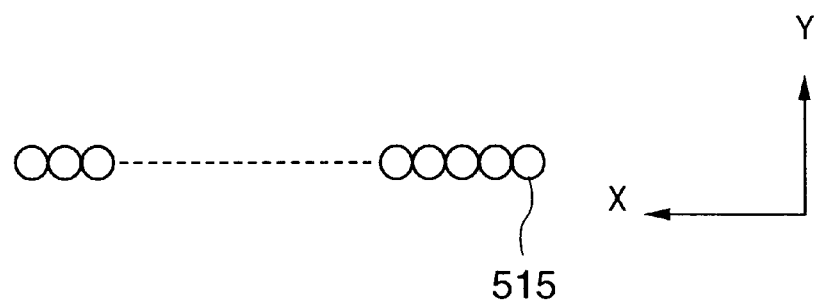
FIG. 4B is a view showing how ink droplets land on a sheet.
Figure 5:
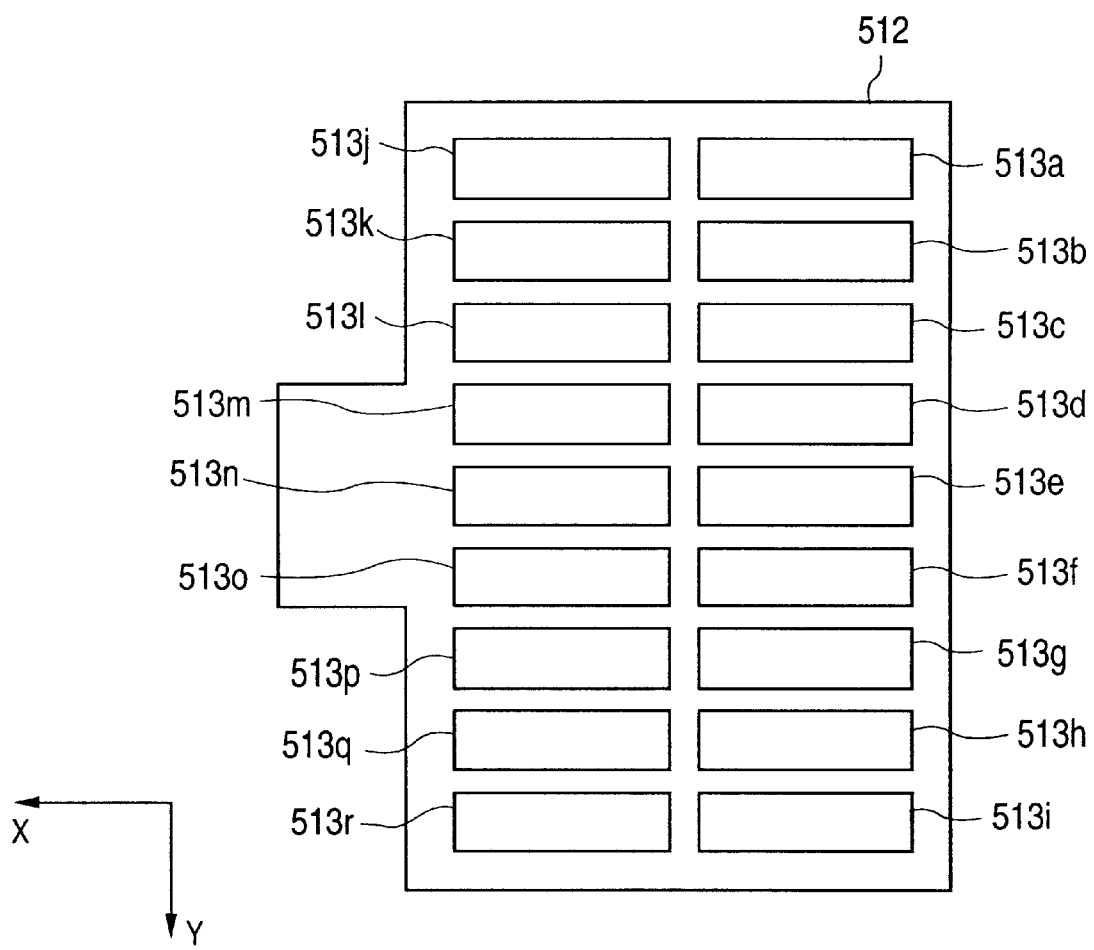
FIG. 5 is a view showing the details of part of the carriage when viewed from below.

FIG. 1 is a perspective view showing the main part (printing unit) of an ink-jet printing apparatus according to an embodiment of the present invention. FIG. 2 is a side view of the apparatus in FIG. 1 viewed from a direction A. FIG. 3 is a view showing the details of part of a carriage in FIG. 3 when viewed from above. FIG. 4A is a view showing the details of part of a head in FIG. 1 when viewed from below. FIG. 4B is a view how ink is ejected on a sheet. FIG. 5 is a view showing the details of part of the carriage when viewed from below.

Referring to FIGS. 1 to 5, reference numeral 501 denotes a sheet on which an image is printed; and 502, 503, 504, and 505, pairs of rollers for conveying the sheet in the X direction. The roller 505 has protruding portions 506 that are arranged at predetermined intervals in the longitudinal direction and brought into contact with the sheet 501. Reference numeral 507 denotes a motor; 508, a pulley mounted on the motor shaft; and 509 and 510, pulleys each mounted on one end of a corresponding one of the rollers 502 and 504 and coupled to the pulley 508 through a belt 511. As the motor rotates, the rollers 502 and 504 rotate. The rollers 503 and 505 are biased by a biasing mechanism (not shown) in the direction in which they are pressed against the rollers 502 and 504. With these arrangements, the sheet is conveyed in the X direction. Reference numeral 512 denotes a carriage on which a plurality of heads 513a to 513r are mounted. As shown in FIG. 4A, many nozzles are arranged on each head to oppose the sheet surface. Reference numerals 516 and 517 denote shafts for slidably holding the carriage 512. The shaft 516 extends through a hole 518 formed in the carriage 512A. A projection 519 formed on the carriage 512 comes into contact with the surface of the shaft 517. With these arrangements, the surface of each head on which nozzles are arranged opposes the sheet at a predetermined distance d. Reference numeral 520 denotes a belt having a portion fixed to the carriage 512. The belt 520 couples a pulley 522 mounted on the shaft of a motor 521 to a pulley 524 rotatably mounted on a stationary shaft 523. With these arrangements, as the motor 521 rotates, the carriage can move in the Y direction and the opposite direction, and can move on the entire area of the sheet in the Y direction and to a position 512a as the standby position of the carriage and a position symmetrical with the position 512a with respect to the sheet. Note that while the head moves above the sheet, the spacing between the nozzle surface and the sheet stays to be the predetermined distance d. Reference characters 526a to 526r denote ink cartridges containing ink, which are loaded in the heads 513a to 513r to supply ink to the heads. The ink cartridges 526a to 526r are detachably loaded in the heads 513a to 513r. If a given ink cartridge runs out of ink, the ink cartridge is replaced with a new ink cartridge to replenish ink. Eighteen ink cartridges are prepared. For example, these ink cartridges include eight types of ink cartridges with black inks having different densities (#1 to #8 are assigned to the ink cartridges in ascending order of density); one each of #1 to #4, two #5, and four each of #6 to #8. Reference numeral 525 denotes a sheet guide placed between the rollers 502 and 504 and 515, a dot formed on the sheet when ink is discharged from a nozzle onto the sheet.

Figure 6:
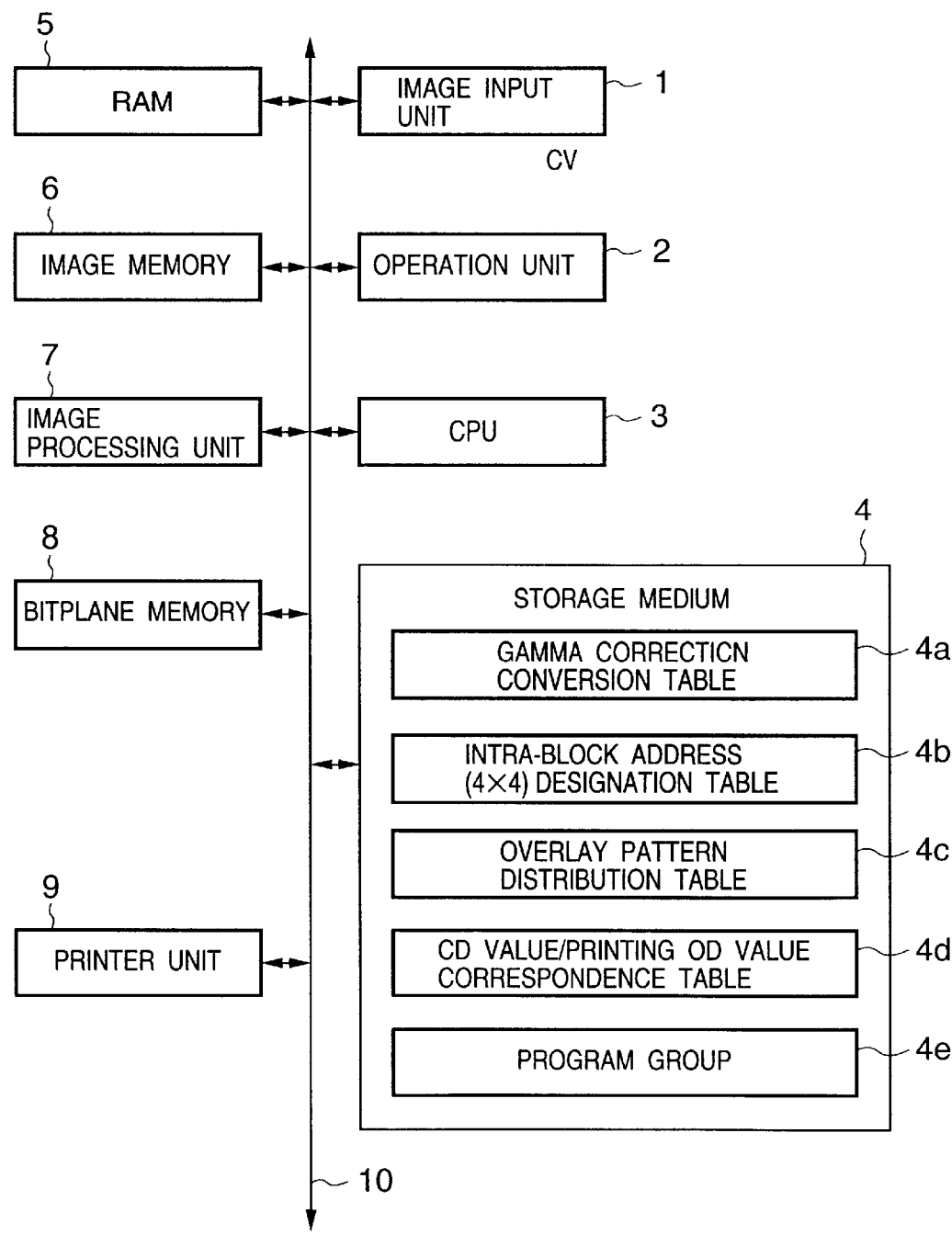
FIG. 6 is a block diagram of a printing control means.

FIG. 6 is a block diagram of a printing control means.

As shown in FIG. 1, reference numeral 1 denotes an image input unit for inputting image data from an external apparatus such as a scanner, X-ray photography apparatus, X-ray CT scanner, or MRI apparatus, and inputting image data (CV value) for each pixel of an image to be printed; 2, an operation unit having various keys for setting various parameters and designating the start of printing and the like; and 3, a CPU for controlling the overall printing apparatus in accordance with various programs stored in a storage medium.

Reference numeral 4 denotes a storage medium (data storage unit) storing programs and the like by which this printing apparatus is operated in accordance with control programs and error processing programs.

All the operations of this printing apparatus are based on these programs. As the storage medium 4 storing the programs, a ROM, FD, CD-ROM, HD, memory card, magnetooptical disk, or the like can be used.

Referring to the storage medium (data storage unit) 4, reference numeral 4a denotes a gamma correction conversion table which is looked up for gamma conversion processing; 4b, an intra-block address (4×4) designation table to be described later; 4c, an overlay pattern distribution table to be described later; 4d, a CD value/printing OD value correspondence table to be described later; and 4e, a program group storing various programs.

Reference numeral 5 denotes a RAM used as a work area for various programs in the storage medium 4, a save area during error processing, and a work area during image processing.

Reference numeral 6 denotes an image memory storing an input image.

Reference numeral 7 denotes an image processing unit for generating a discharge pattern for realizing multilevel grayscale expressions by the ink-jet scheme; and 8, a bitplane memory for storing binarized image data.

Reference numeral 9 denotes a printer unit for forming a dot image on the basis of the discharge pattern generated by the image processing unit in printing operation. The printer unit 9 includes the printing unit shown in FIG. 1. Reference numeral 10 denotes a bus line for the transmission of address signals, data, control signals, and the like in this printing apparatus.

[Details of Image Processing Unit]

The details of the image processing unit 7 in FIG. 6 will be described with reference to FIG. 7.

Note that the process to be described below can be implemented by both hardware (image processing board) and software. If the process is to be implemented by software, the image processing unit 7 is not present, and an image processing program is stored in the control program group. This program is executed under the control of the CPU, thereby executing the following process.

In gamma correction processing step 11, image data CV input by the image input unit 1 is converted into density data CD (gray level) indicating a density by using the gamma correction conversion table 4a, and stored in the image memory 6. In this embodiment, CD values are classified into levels with 12 bits.

In preprocessing step 12, enlargement interpolation processing, image rotation, formatting, and the like are performed for the image in the image memory. In pixel of interest selection step 13, one pixel (target pixel) to be processed is selected in the image memory area to obtain the density data CD.

In intra-block address lookup step 14, data indicating the specific address of the pixel of interest to be processed within the block is obtained by looking up the intra-block address designation table 4b.

In step 15 of looking up the CD value in the overlay pattern distribution table 4c and the corresponding address, an ink combination for the pixel of interest (target pixel) is obtained by looking up the overlay pattern distribution table 4c in accordance with the CD value of the pixel of interest (target pixel), the CD value of the pixel of interest, and the address data of the pixel of interest.

In ink distribution processing step 16, binary signals representing the discharging/non-discharging of inks with the respective densities are determined in accordance with the ink combination obtained in the above manner, and binary signals representing the discharging/non-discharging of the respective heads are determined according to a predetermined rule. These signals are then recorded on a bitplane for each head.

With the above steps, the processing for one pixel of interest is completed.

By repeating steps 14, 15, and 16 a number of times equal to the total number of pixels in a given area on the basis of the density data CD of the image, binary signals d1, d2, d3, . . . representing the discharging/non-discharging of ink for the respective pixels with respect to the heads with different densities are formed.

In this case, the above area may be an entire one-page area to be subjected to printing operation, and the following printing process may be started after a bitplane for one page is completed. Alternatively, one page is divided into smaller areas, and a bitplane may be completed for each small area. After an image is printed on a given area, processing for the next area may be started. In the latter case, each bitplane may be divided into a plurality of bitplanes. While a printing process for a preceding area is performed, a bitplane for the next area may be generated.

In printing operation, a sheet 501 is fed from the left side in FIG. 2 to a position between the rollers 502 and 53 by a means (not shown). The sheet is then intermittently conveyed in the X direction a predetermined distance at a time by the motor 507. While the sheet is at rest, the motor 521 rotates to move the carriage in the Y direction at a predetermined speed. While a head on the carriage passes over the sheet, a nozzle discharge command signal corresponding to an image signal is sent from the printing control means shown in FIGS. 6 and 7, and ink droplets are selectively discharged from each nozzle. While the head passes over the sheet and is located at a position away from the sheet, the motor 507 moves the sheet in the X direction by a predetermined distance and stops. The motor 507 then moves the sheet again at a predetermined speed, and ink droplets are selectively discharged in the same manner as described above. By repeating this process, a desired image is printed on the sheet in the end. The sheet having undergone printing operation is conveyed to the left in FIG. 2 by the rollers 504 and 506 and then discharged to the left side in FIG. 2 by a convey means (not shown).

[Example of Each Table]

Example of various types of tables stored in the storage medium 4 will be described next.

Figure 8:
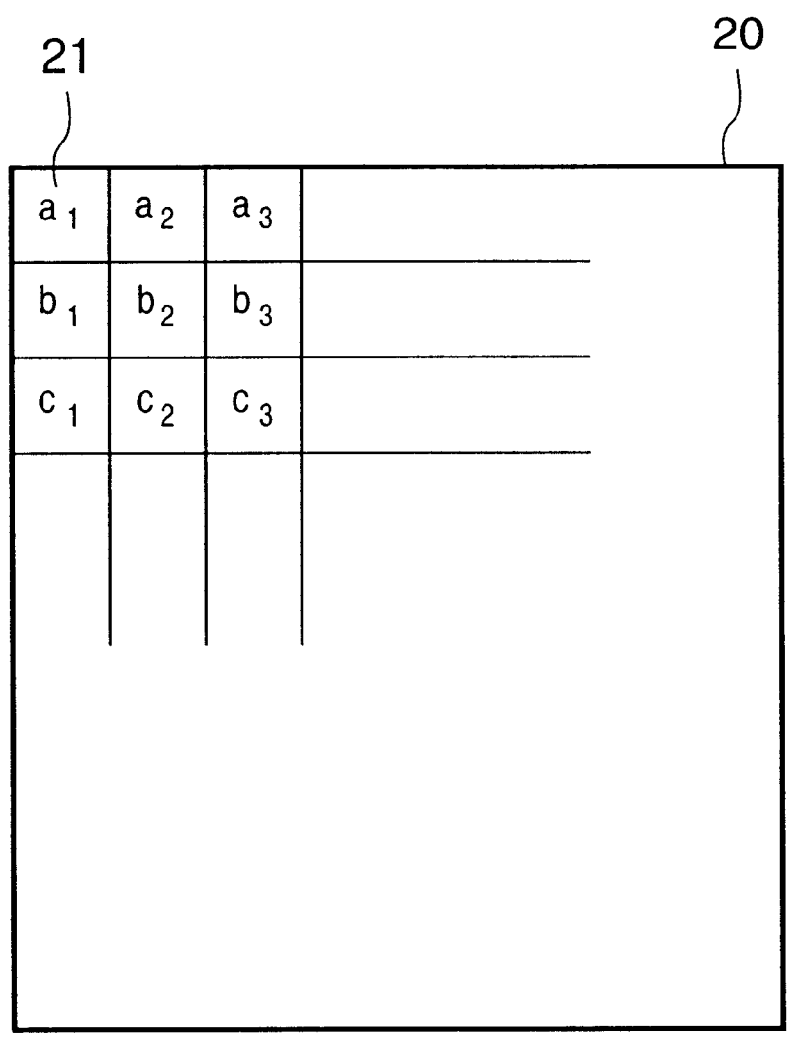
FIG. 8 is a view showing an example of how an image is divided into blocks.

FIG. 8 is a view showing a 1-page image divided into blocks. Reference symbols $a_1, a_2, a_3, \ldots, b_1, b_2, b_3, \ldots, c_1, c_3, c_3, \ldots$, denote blocks.

Figure 9A:
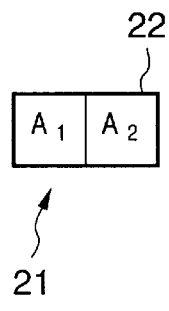
FIGS. 9A to 9E are views showing an example of a block address designation table.
Figure 9B:
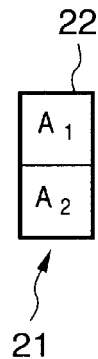
Figure 9C:
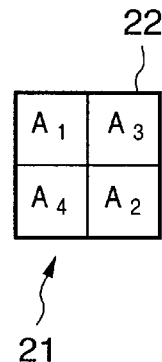
Figure 9D:
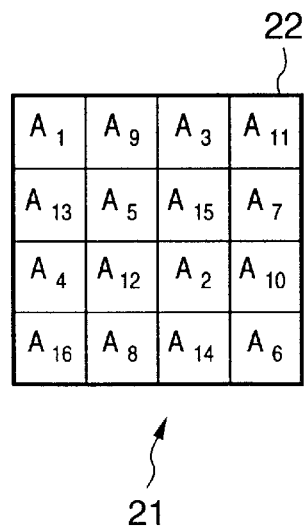
Figure 9E:
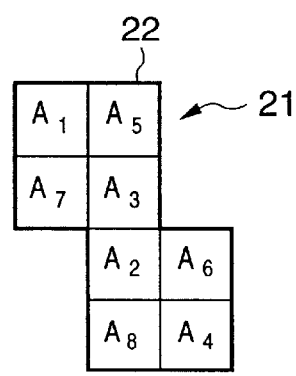

Each of FIGS. 9A to 9E shows an example of the pixel arrangement of one block. FIGS. 9A, 9B, 9C, 9D, and 9E respectively show a 2 (horizontal)×1 (vertical) pixel arrangement, a 1×2 pixel arrangement, a 2×2 pixel arrangement, a 4×4 pixel arrangement, and a 2×4 pixel arrangement in an irregular shape. As shown in FIG. 9E, the pixel arrangement need not always be rectangular. Referring to FIGS. 9A to 9E, reference symbols $A_1, A_2, A_3, \ldots$ denote addresses assigned to the pixels in each block. These addresses may be arranged according to a predetermined rule as shown in FIGS. 9A to 9E or may be arranged randomly. All blocks may have identical arrangements, or different arrangements may be set for the respective blocks. An intra-block address designation table represents these rules in the form of a table. Addresses may be determined for the respective pixels by using a given algorithm instead of this table. The following description will be made by exemplifying the 4×4 pixel arrangement.

Pixels vary in size. In the following description, however, the pixel size is assumed to be 600 dpi. In this case, the block size corresponds to 300 dpi on a 2×2 basis, and 150 dpi on a 4×4 basis.

Each of FIGS. 10A and 10B shows an example of an overlay pattern distribution table. The numerals vertically arranged in the CD value columns represent CD values, and "$A_1$" to "$A_{16}$" horizontally arranged in the CD value row represent the addresses of the respective pixels in a block having an arrangement like the one shown in FIG. 9D. Of the numerals below each block address, the four numerals vertically arranged, except for the hatched portion, for each CD value represent the types of inks to be overlaid at the block address of the CD value. The symbol "x" represents that no ink is to be ejected. In this case, up to four ink droplets can be overlaid on one pixel. There are eight types of inks, namely, #1 to #8. The printing OD values of these inks are 0.012, 0.024, 0.048, 0.096, 0.144, 0.192, 0.384, and 0.768. The printing OD value of each pixel is the total printing OD value of overlaid ink droplets. That is, the so-called additive property is satisfactory ensured. In addition, the amounts of ink discharged from the respective head are substantially the same. Assume that the ink amount is variable. In this case, if, for example, ink with an OD value of 0.048 is to be discharged in two unit amounts, the printing OD value is assumed to become 0.096, thus allowing the following description to be applied to this case as well. Each of the numerals in the hatched portions below $A_1$ to $A_{16}$ is the total printing OD value of ink. Note that this total value is set only for the sake of descriptive convenience, but need not be set in an actual table. In addition, "$\alpha_1$" to "$\alpha_4$" represent 2×2 subblocks in the block shown in FIG. 9D. More specifically, "$\alpha_1$" represents the first subblock ($A_1, A_5, A_9, A_{13}$); "$\alpha_2$", the second subblock ($A_2, A_6, A_{10}, A_{14}$); "$\alpha_3$", the third subblock ($A_3, A_7, A_{11}, A_{15}$); and "$\alpha_4$", the fourth subblock ($A_4, A_8, A_{12}, A_{16}$). The numeral below each subblock represents the average printing OD value of a corresponding pixel. Note that the subblocks $\alpha_1$ to $\alpha_4$ need not always be set.

In this case, a table is prepared for 4,096 CD values ranging from CD =0 (64 inks are ejected at every address four times) to CD =4095 (no ink is ejected at every address). (Since the number of different combinations is less than 4,096, the same combination of inks to be used at addresses $A_1$ to $A_{16}$ is set for several CD values. In this case, inks are ejected with the same printing OD values even with different CD values.)

Figure 7:
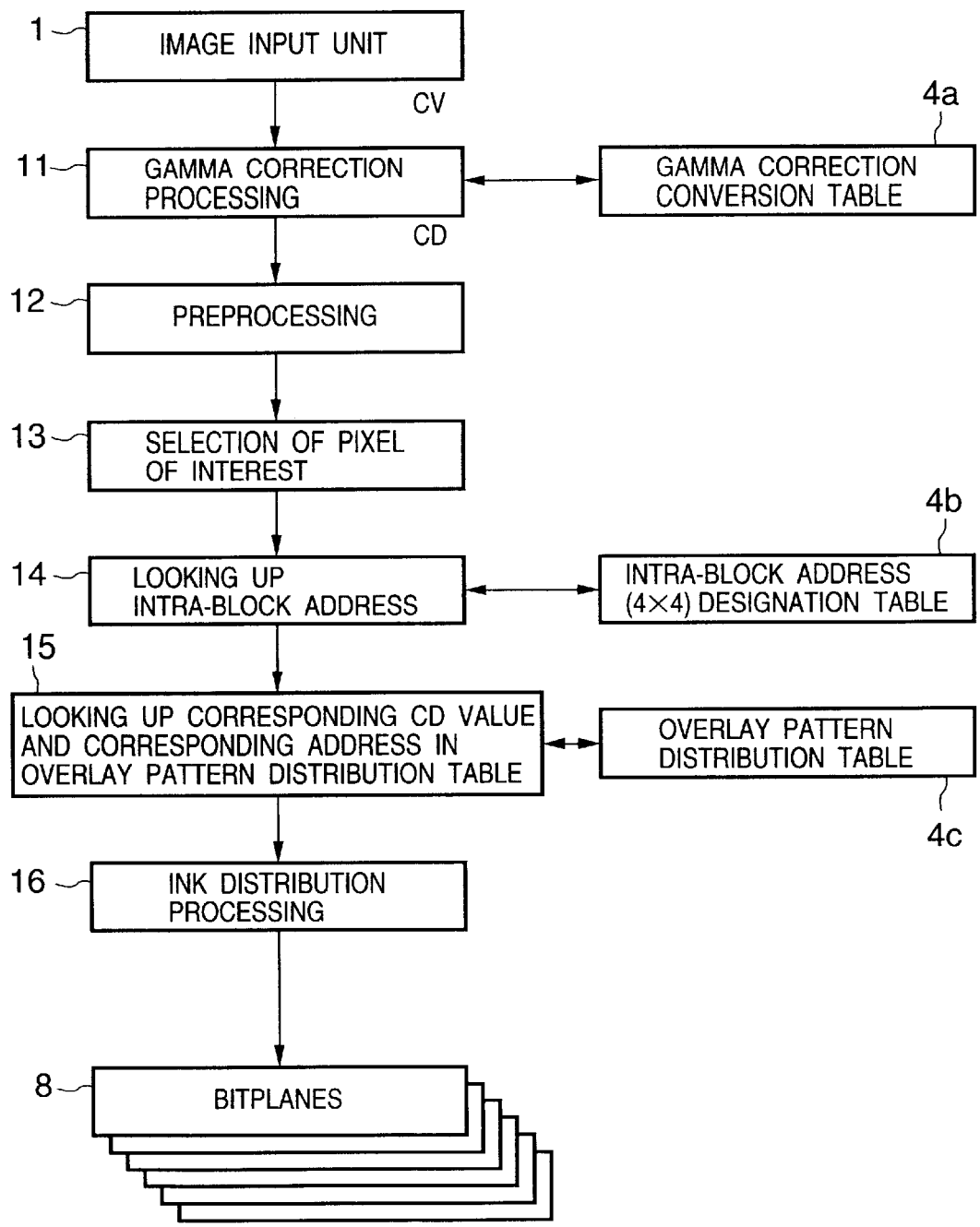
FIG. 7 is a block diagram of an image processing unit.

With the above arrangement, in step 15 of looking up the CD value in the overlay pattern distribution table in FIG. 7 and the corresponding address, an ink combination for the pixel of interest (target pixel) is determined on the basis of the CD value of the pixel of interest under processing, the intra-block address of the pixel of interest, and the table shown in FIGS. 10A and 10B.

The table shown in FIGS. 10A and 10B may be divided into tables as follows. Combinations of various types of inks to be overlaid four times are formed in one table, and the respective combinations are named. In the table shown in FIGS. 10A and 10B, the above combination names are written at the respective addresses instead of the names of inks to be overlaid. Inks are then overlaid according to this combination in correspondence with the CD value and address of the corresponding pixel. By dividing the table into two parts in this manner, the overall table volume can be reduced, and hence memory savings can be attained.

In the above table, printing OD values may be arranged at the respective addresses in various ways. For example, printing OD values DA1, DA2, ..., DAa of a pixels ($A_1$, $A_2$, ..., Aa) may be arranged to satisfy DA1≦DA2≦DA3≦...≦DAa. This arrangement facilitates design. As shown in FIG. 9D, if a pixels (DA1, $A_2$, ..., Aa) are arranged such that pixels having adjacent addresses are arranged so as not to be adjacent to each other, as the desired OD value increases (or decreases), the printing OD values increase (decrease) without being unbalanced within the block. With this operation, when the desired OD value increases (or decreases), the resultant image does not look grainy much but seems to gradually change.

[Principle of Multilevel Grayscale Printing]

The reason why multilevel grayscale printing can be performed by the above arrangement and procedure will be described next.

As shown in FIG. 10B, if all the pixels in a given block have the same CD value, e.g., CD=4092, ink with a printing OD value of 0.012 is ejected three times within this block. According to the principle of area grayscale, the printing OD value of this block is the average of the printing OD values of the respective pixels $A_1$ to $A_{16}$. That is, the printing OD value of the block is 0.012×3/16. If all the pixels in another block have CD=4091, the printing OD value of this block becomes 0.012×4/16. Since inks with printing OD values of 0.012 to 0.768 can be used up to four times, the average of printing OD values at CD=0 becomes 3.07 (=printing OD value of 0.768 of ink with highest density×number of times that ink can be overlaid). Gradation expressions can be made from 0 to 3.07 in increments of 0.012/16, i.e., 4,096 levels (the actual number of levels is slightly smaller than this because ink is ejected on some portions with the same printing OD value with respect to several CD values).

Assume that all the pixels in the first subblock have CD=4092 and all the pixels in the second subblock have CD=4088. In this case, according to FIG. 10B, ink with a printing OD value of 0.012 is used once for the pixel $A_1$ in the first subblock, and ink with a printing OD value of 0.012 is used twice for the pixels $A_2$ and $A_6$ in the second subblock. As a consequence, ink with a printing OD value of 0.012 is used once for the first subblock, and ink with a printing OD value of 0.012 is used twice for the second subblock. That is, if the CD value difference is about 4 on a subblock basis, different average printing OD values are set. More specifically, images can be expressed in about 1,000 gray levels on a subblock basis. Likewise, images can be expressed in about 256 levels on a pixel basis. (In either case, the actual number of gray levels is slightly smaller than the above number because there are some portions on which ink with the same printing OD value is ejected with respect several CD values).

[Countermeasures against Pseudo Contours]

The reason why pseudocontours are eliminated by the present invention will be described next. A case where the CD value is near 3043 will be described below. This applies to other portions. In the tables shown in FIGS. 10A and 10B, when a CD value of 3043 is compared with a CD value of 3044, the corresponding operations differ only in the combination of inks to be ejected onto the pixel $A_7$ among the 16 pixels. More specifically, the number of times ink #7 is ejected increases by one, and the number of times ink #6 is ejected decreases by two. If, for example, the printing OD value obtained by ink #6 is equal to the design value, and the printing OD value obtained by ink #7 exhibits an error of 3%, the average error at these 16 pixels is 0.384×0.03/16= 0.00072. This value is smaller than the resolution of which the human eye is capable (density difference=0.003 ) described above, and hence the resultant portion is not recognized as a contour. That is, no pseudocontours is produced. In a place where the CD value abruptly changes from 3044 to 3039, the number of times ink #7 is ejected increases by five, and the number of times ink #6 is ejected decreases by 10. If, therefore, an error similar to that described above is assumed, the error becomes 0.384×0.03× 5/16=0.003. However, no problem arises because a contour should be seen in such a place.

In addition, the present inventors have found that in printing an image whose grayscale gradually changes, increasing stepwise the using ratio of pixels having a density different from the preceding density, instead of changing given pixels to pixels having a different density at once as in the prior art, makes it difficult to recognize the resultant portion as a pseudocontours.

Figure 23A:
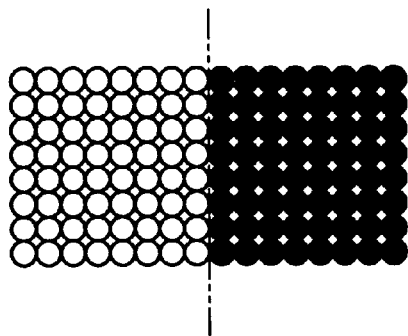
FIGS. 23A to 23C are views for explaining a method of reducing pseudocontours.
Figure 23B:
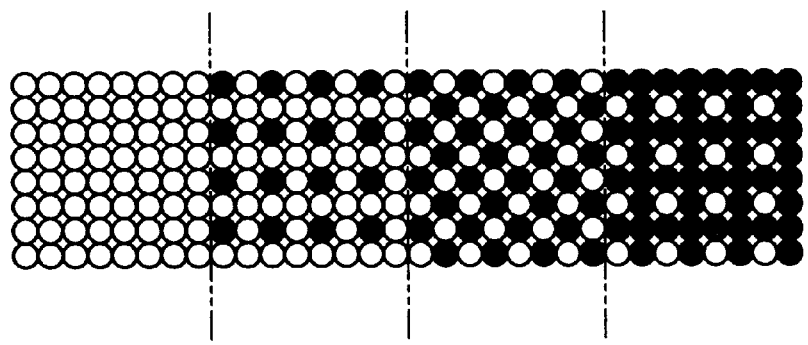
Figure 23C:
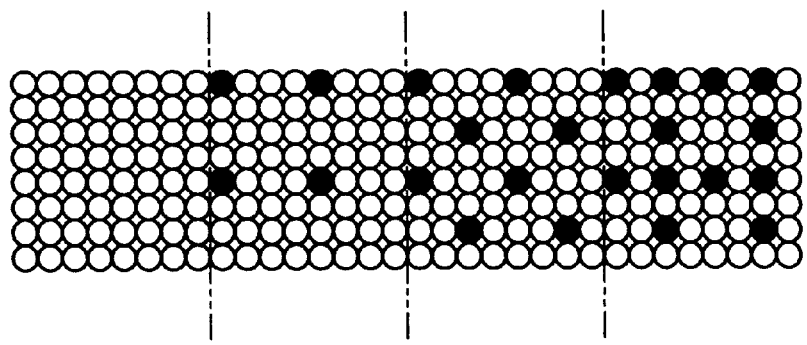

Each of FIGS. 23A to 23C shows an example of a pattern in which pixels are switched to pixels having a density higher than the preceding density by one step. The pattern shown in FIG. 23A is a pattern that has conventionally been used, in which pixels are simultaneously switched to a pixel having a density higher than the preceding density by one step. In this pattern, as described above, the upper limit of density differences at which the boundary portion indicated by the dotted line in FIG. 23A cannot be recognized as a contour is 0.003.

In the pattern shown in FIG. 23B, the using ratio of pixels having a density higher than the preceding density by one step is gradually increased in four steps, i.e., 1/4, 2/4, 3/4, and 4/4/. In this pattern, the upper limit of density differences at which the boundary portion indicated by the dotted line in FIG. 23B cannot be recognized as a contour is 0.015.

In the pattern shown in FIG. 23C, the using ratio of pixels having a density higher than the preceding density by one step is gradually increased in 16 steps, i.e., 1/16, 1/16, ... , 16/16. In this pattern, the upper limit of density differences at which the boundary portion indicated by the dotted line in FIG. 23C cannot be recognized as a contour is 0.03.

As described above, increasing stepwise the using ratio of pixels having a density different from the preceding density in this manner makes it difficult to see a boundary portion as a contour.

When the density gradually changes, a pseudocontours can be made invisible with a minimum density difference of 0.03 or less by controlling the occurrence pattern of pixels such that the density changes in the pattern shown in FIG. 23C. By controlling the occurrence pattern of pixels to change the density in the pattern in FIG. 23B, a pseudocontours can be made invisible with a minimum density difference of 0.015 or less.

In other words, in the pattern in FIG. 23B, when the density gradually changes (the gray level increases by one), the probability of occurrence of a pixel having a density higher than the preceding density by on step is 1/4. In the pattern in FIG. 23C, when the density gradually changes (the gray level increases by one), the probability of occurrence of a pixel having a density higher than the preceding density by on step is 1/16.

As described above, when the density gradually changes (the gray level increases by one), a pseudocontours can be made invisible by controlling the probability of occurrence of a pixel having a density higher than the preceding density by one step.

Various methods of forming the tables shown in FIGS. 10A and 10B are conceivable depending on purposes. To maximize the number of gray levels on a 4 ×4 block basis, it is preferable that the differences between the printing OD values of pixels at the respective addresses in each block be neglected, and the number of portions on which ink is ejected with the same printing OD value with respect to several CD values be minimized, thereby maximizing the number of average printing OD value steps. To maximize the number of gray levels on a 2×2 subblock basis, it is preferable that the differences between the printing OD values of pixels at the respective addresses in each block be neglected, and the average printing OD values of the subblocks in one block be made as uniform as possible. In addition, to minimize the graininess of an image, the printing OD values of the respective pixels in one block is preferably made as uniform as possible even at the expense of the number of gray levels.

Second Embodiment

The second embodiment will be described with reference to FIGS. 11, 12, and 13.

In the second embodiment, seven types of inks, i.e., inks #1 to #7, are prepared, and their printing OD values are 0.024, 0.048, 0.096, 0.144, 0.192, 0.384, and 0.768. The number of ink types is set to seven only for the sake of descriptive convenience. As in the first embodiment, the number of ink types may be set to eight. The table shown in FIG. 11 has substantially the same arrangement as that of the tables shown in FIGS. 10A and 10B except that printing OD value columns are set, in place of CD value columns, in which the average printing OD values of pixels $A_1$ to $A_{16}$ are written. FIG. 12 shows a table in which CD values are made to correspond to the printing OD values in FIG. 11. In this table, with respect to CD values of 0 to 4095, printing OD values best suited to expressing the CD values are selected from the printing OD values in FIG. 11 and written. FIG. 13 corresponds to FIG. 7 and differs therefrom only partly.

Figure 12:
FIG. 12 is a view showing a table in which CD values are made to correspond to the printing OD values in FIG. 11.
Figure 13:
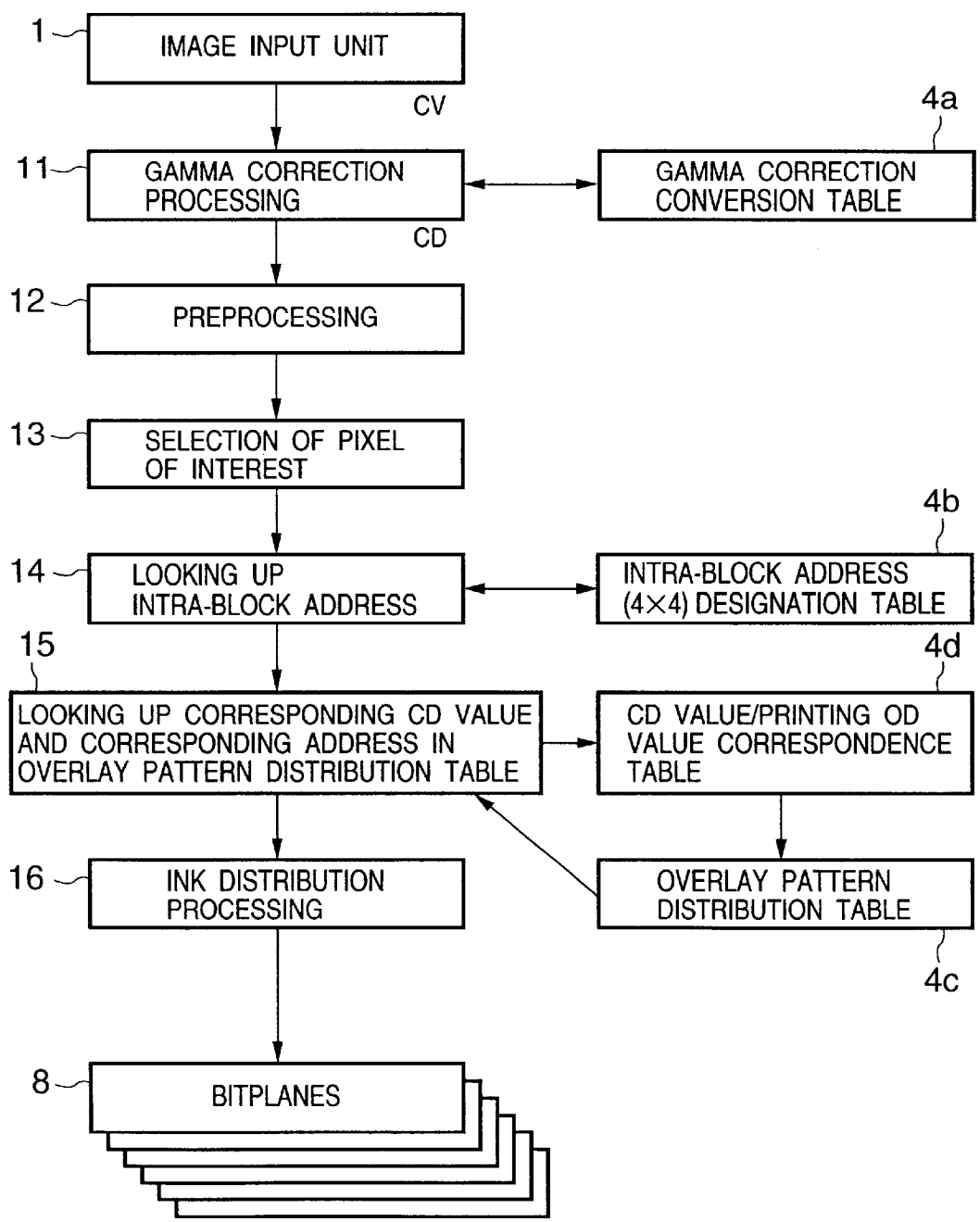
FIG. 13 is a block diagram of an image processing unit in the second embodiment.

In this case, in step 15 of looking up the CD value in the overlay pattern distribution table in FIG. 13 and corresponding address 15, a printing OD value is determined from the CD value of the pixel of interest from the CD value/printing OD value correspondence table shown in FIG. 12. In addition, an overlay pattern for the pixel at the corresponding address is determined from the printing OD value row in the table shown in FIG. 11.

According to this method, the number of tables used increases by one, but the overall amount of table data can be decreased, allowing memory savings. Note that as a means for obtaining the correspondence between the densities and the above density data of an image formed on a printing medium by halftone printing, an algorithm (e.g., a mathematical expression) for making the CD values correspond to the printing OD values instead of the table shown in FIG. 12. These values may be made to correspond to each other in accordance with this algorithm.

According to this method, printing OD values can be corrected as in the third embodiment to be described below.

Third Embodiment

The third embodiment will be described with reference to FIGS. 14A, 14B, 15, and 16.

The first embodiment is based on the additive property. According to the experiments conducted by the present inventor, the additive property almost holds on transmission media, but does not hold on reflection media. Strictly speaking, the additive property does not hold on transmission media as the printing OD value increases. Even in this case, the present invention can be applied if the following correction method is used.

Figure 14A:
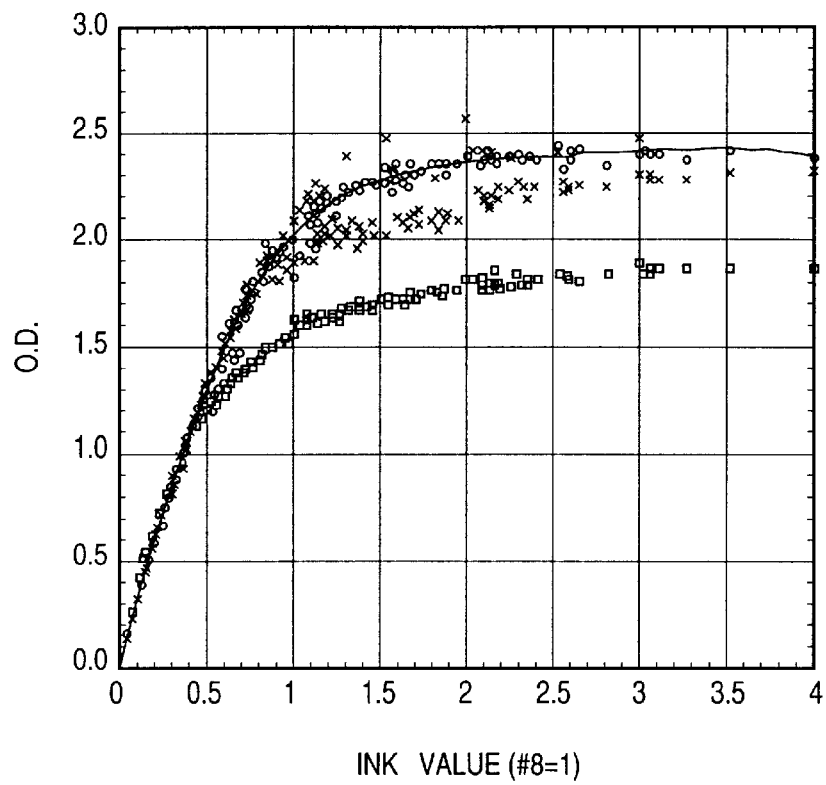
FIGS. 14A and 14B are ink value/density graphs.
Figure 14B:
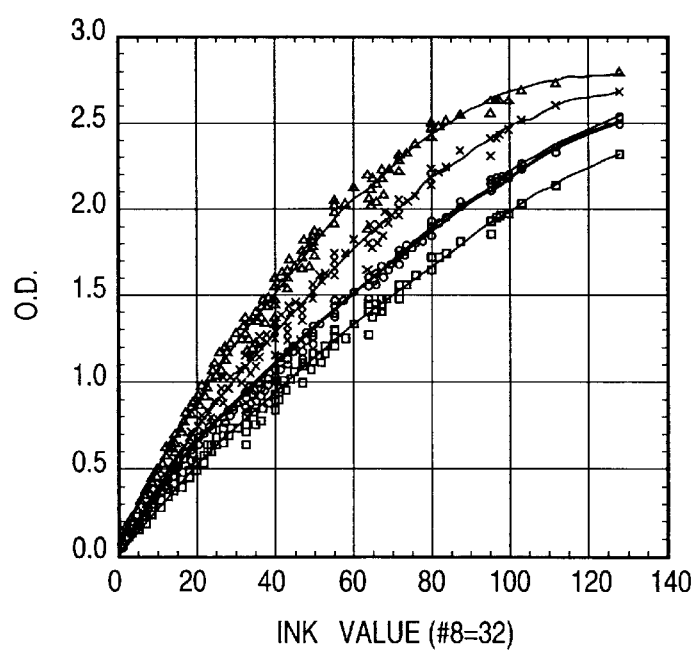

More specifically, a virtual printing OD value (ink value) with which the additive property holds is assumed, and the actual printing OD value is made to correspond to this ink value in the form of a graph or relational expression. When ink droplets are to be overlaid, ink values are obtained first from the printing OD values of the ink droplets to be overlaid on the basis of the above correspondence, and the ink values of the ink droplets to be overlaid are totaled. The printing OD value of the pixel obtained by overlaying the ink droplets is obtained again according to the above correspondence. FIGS. 14A and 14B are graphs in such a case. An abscissa x indicates a value proportional to an ink value (a numeral based on the ink value of ink #8 converted into 1 on reflection media; a numeral based on the ink value of ink #8 converted into 32 on transmission media). An ordinate y indicates the OD value. Referring to FIGS. 14A and 14B, "(a)" represents the results on various reflection media; and "(b)", the results on various transmission media. Since the ink value is proportional to the CD value, the ink value is represented by a straight line in FIGS. 14A and 14B. The printing OD value is almost equal to the ink value in a low-density area. However, as the density increases, the corresponding curve can be generally approximated by a polynomial in x. For example, in a transmission medium, when constants were obtained with an approximation of $y=ax+bx2+cx3+dx4$, it was found that a=0.94256, b=−0.14854, c=0.047632, and d=−0.0062243 optimized an approximation of a printing OD value.

Figure 16:
FIG. 16 is a table in which CD values are made to correspond to the printing OD values in FIG. 15.
Figure 20:
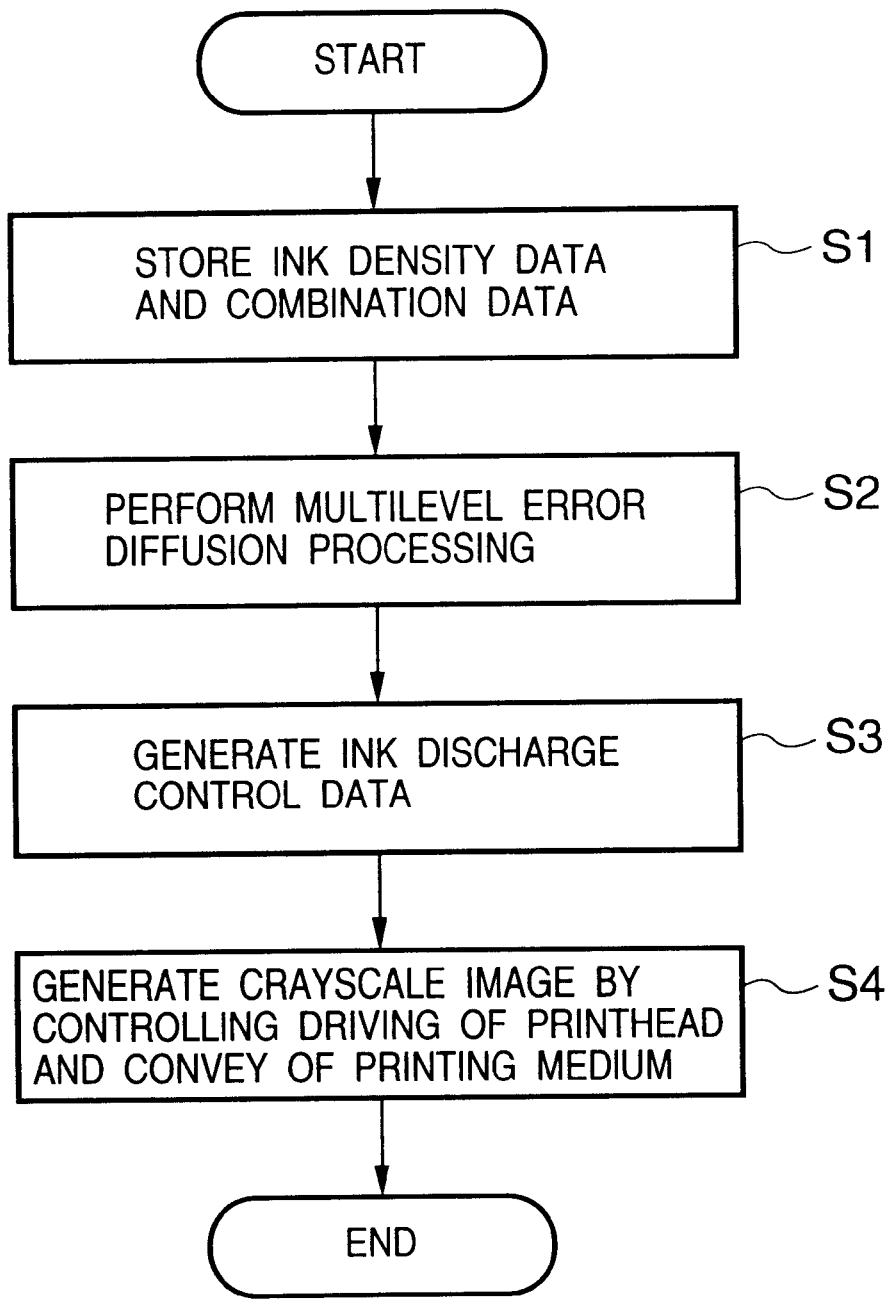
FIG. 20 is a flow chart showing a procedure for printing control on a conventional ink-jet printing apparatus.
Figure 22:
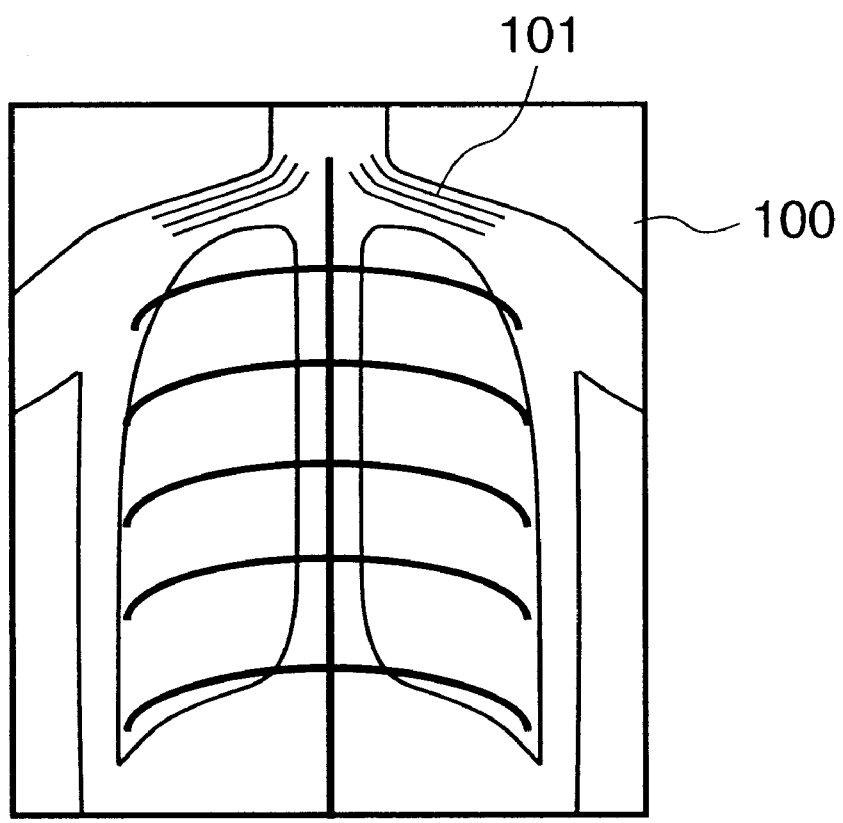
FIG. 22 is a view showing an example of how a chest X-ray image is printed on a transparent film by a conventional method and explaining pseudocontours.

In this case, eight ink types, i.e., inks #1 to #8, are used, and their ink values are set to 0.012, 0.024, 0.048, 0.096, 0.144, 0.192, 0.384, and 0.768. FIG. 15 shows a table corresponding to FIG. 11. In this case, ink can be overlaid five times for each of some pixels. Referring to FIG. 15, the sum of the ink values of ink droplets to be overlaid is obtained at each gray level and address, and the obtained value is represented by x. A value y obtained correcting this value x using the above mathematical expression is written in each hatched portion. Each numeral in the printing OD value column represents the average printing OD value of 16 pixels. FIG. 16 shows a table corresponding to FIG. 12, in which the printing OD values in the rows to be used in the table shown in FIG. 15 are written in correspondence with the respective CD values.

In the case of a reflection medium as well, correction can be performed in the same manner as described above by obtaining appropriate coefficients, and printing can be performed in the same manner as described above by using this correction expression.

Fourth Embodiment

The fourth embodiment will be described with reference to FIGS. 17A to 17C and 18A and 18B.

Figure 18A:
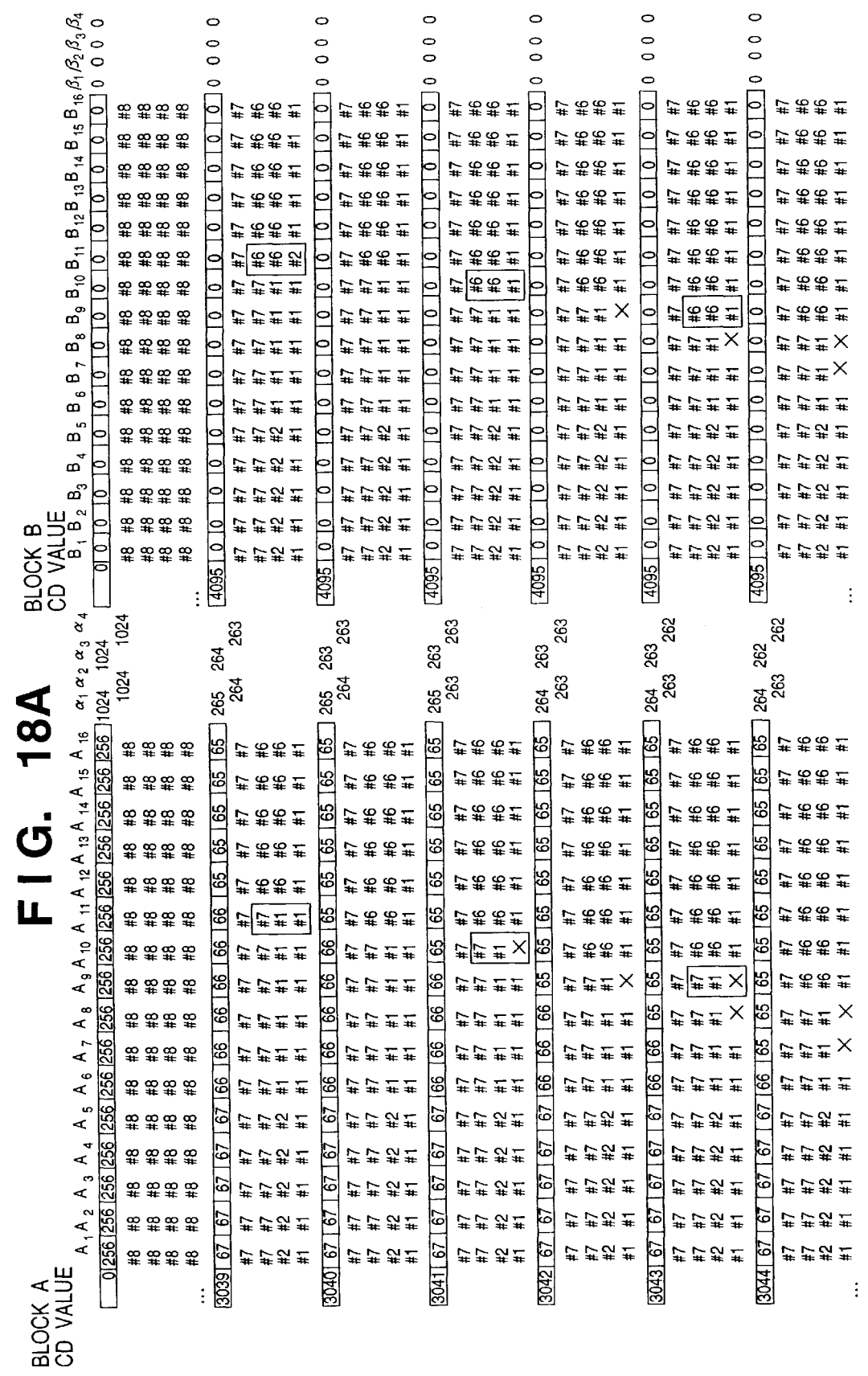
Figure 18B:
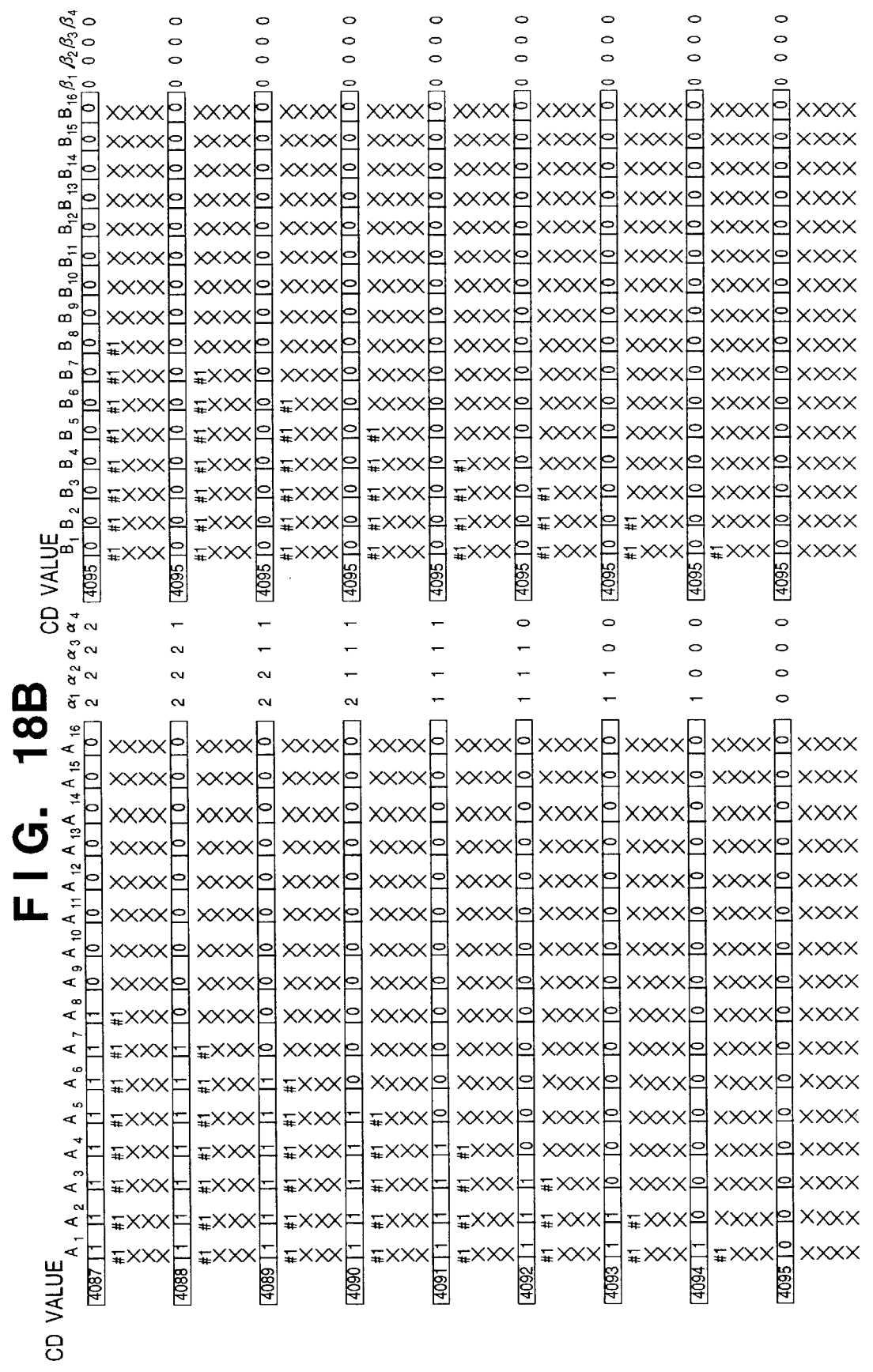

FIGS. 17A to 17C correspond to FIG. 8. There are two types of 4×4 blocks, i.e., blocks A and B, which are arranged in the pattern shown in FIG. 17C. FIGS. 18A and 18B correspond to FIGS. 10A and 10B and show tables similar to those shown in FIGS. 10A and 10B, in which blocks A and B are arranged, respectively. Reference symbols β1 to β4 denote 2×2 subblocks in the block B. More specifically, reference symbol β1 denotes the first subblock ($b_1$, $B_5$, $B_9$, $B_{13}$); β2, the second subblock ($b_2$, $B_6$, $B_{10}$, $B_{14}$); β3, the third subblock ($b_3$, $B_7$, $B_{11}$, $B_{15}$); and β4, the fourth subblock ($B_4$, $B_8$, $B_{12}$, $B_{16}$). The numeral written below each subblock represents the average printing OD value of pixels constituting the subblock. Note that the subblocks β1 to β4 need not always be prepared.

The table of the block A and the table of the block B are substantially the same but differ from each other only partly (hatched portions). In this case, the switching ratio of inks further decreases with a change in CD value. More specifically, in the case shown in FIGS. 10A and 10B, as the CD value changes by one, the number of times ink #7 is used changes by one within the block. In the case shown in FIGS. 18A and 18B, however, as the CD value changes by one, the number of times ink #7 is used alternately changes by one in the blocks A and B; the change ratio decreases to 1/2. For this reason, considering the sum of the average printing OD values of the blocks A and B, the error between a desired OD value and a printing OD value becomes 0.384×0.03/(16× 2)=0.00036 on the basis of the above assumption. That is, the error further decreases as compared with the case shown in FIGS. 10A and 10B.

The number of blocks is not limited to two. For example, four or nine types of blocks may be set. In such a case, the error between a desired OD value and an average printing OD value can be further decreased. The fourth embodiment is effective especially when ink with a high density such as ink #8 is used, or a variation in the printing OD value of ink is larger than that in the above case.

[Other Means]

There is no specific restriction imposed on the ink-jet scheme to be used. This embodiment has exemplified the case where liquid inks are used. However, the present invention can be applied to a scheme of liquefying solid ink and discharging it. In this case, ink replenishment is performed by using solid ink. Either reflection sheets or transmission sheets may be used.

In this embodiment, a sheet is intermittently fed, and a head is moved in a direction perpendicular to the feeding direction of the sheet while the sheet is at rest, thereby printing. However, the present invention is not limited to this and may use the scheme of feeding a sheet at a constant speed, and using a linear stationary head that covers the sheet width in a direction perpendicular to the feeding direction of the sheet, thereby printing while the sheet is fed at the constant speed. In this case, the printing apparatus has heads each having a length that covers the width of a sheet for each of different kinds of inks.

The ink supply scheme to be used is not limited to the cartridge scheme shown in FIG. 1. This printing apparatus may use the scheme of supplying ink from an ink tank, prepared at a place other than a place on the carriage, to a head through a tube.

In addition, this apparatus may use the scheme of supplying only ink that is used in large quantities through a tube and supplying other inks in the form of cartridges.

In the above embodiments, the droplets discharged from the printheads are ink droplets, and the liquid stored in each ink tank is ink. However, the material stored in each tank is not limited to ink. For example, a process solution to be discharged onto a printing medium to improve the fixing performance or water resistance of a printed image or its image quality may be stored in an ink tank.

Each of the embodiments described above has exemplified a printer, which comprises means (e.g., an electrothermal transducer, laser beam generator, and the like) for generating heat energy as energy utilized upon execution of ink discharge, and causes a change in state of an ink by the heat energy, among the ink-jet printers. According to this ink-jet printer and printing method, a high-density, high-precision printing operation can be attained.

As the typical arrangement and principle of the ink-jet printing system, one practiced by use of the basic principle disclosed in, for example, U.S. Pat. Nos. 4,723,129 and 4,740,796 is preferable. The above system is applicable to either one of so-called an on-demand type and a continuous type. Particularly, in the case of the on-demand type, the system is effective because, by applying at least one driving signal, which corresponds to printing information and gives a rapid temperature rise exceeding film boiling, to each of electrothermal transducers arranged in correspondence with a sheet or liquid channels holding a liquid (ink), heat energy is generated by the electrothermal transducer to effect film boiling on the heat acting surface of the printing head, and consequently, a bubble can be formed in the liquid (ink) in one-to-one correspondence with the driving signal. By discharging the liquid (ink) through a discharge opening by growth and shrinkage of the bubble, at least one droplet is formed. If the driving signal is applied as a pulse signal, the growth and shrinkage of the bubble can be attained instantly and adequately to achieve discharge of the liquid (ink) with the particularly high response characteristics.

As the pulse driving signal, signals disclosed in U.S. Pat. Nos. 4,463,359 and 4,345,262 are suitable. Note that further excellent printing can be performed by using the conditions described in U.S. Pat. No. 4,313,124 of the invention which relates to the temperature rise rate of the heat acting surface.

As an arrangement of the printing head, in addition to the arrangement as a combination of discharge nozzles, liquid channels, and electrothermal transducers (linear liquid channels or right angle liquid channels) as disclosed in the above specifications, the arrangement using U.S. Pat. Nos. 4,558, 333 and 4,459,600, which disclose the arrangement having a heat acting portion arranged in a flexed region is also included in the present invention. In addition, the present invention can be effectively applied to an arrangement based on Japanese Patent Laid-Open No. 59-123670, which discloses the arrangement using a slot common to a plurality of electrothermal transducers as a discharge portion of the electrothermal transducers, or Japanese Patent Laid-Open No. 59-138461, which discloses the arrangement having an opening for absorbing a pressure wave of heat energy in correspondence with a discharge portion.

Furthermore, as a full line type printing head having a length corresponding to the width of a maximum printing medium which can be printed by the printer, either the arrangement which satisfies the full-line length by combining a plurality of printing heads as disclosed in the above specification or the arrangement as a signal printing head obtained by forming printing heads integrally can be used.

In addition, not only an exchangeable chip type printing head, as described in the above embodiment, which can be electrically connected to the apparatus main unit and can receive an ink from the apparatus main unit upon being mounted on the apparatus main unit but also a cartridge type printing head in which an ink tank is integrally arranged on the printing head itself can be applicable to the present invention.

It is preferable to add recovery means for the printing head, preliminary auxiliary means, and the like provided as an arrangement of the printer of the present invention since the printing operation can be further stabilized. Examples of such means include, for printing head, capping means, cleaning means, pressurization or suction means, and preliminary heating means using electrothermal transducers, another heating element, or a combination thereof. It is also effective for stable printing to provide a preliminary discharge mode which performs discharge independently of printing.

In addition to the print mode of printing images only in a main color such as black, the printer may have at least one of the print mode of printing images in different colors and the print mode of printing images in full-color as a mixture of colors, which mode may be realized by an integral printhead or a combination of a plurality of printheads.

Moreover, in each of the above-mentioned embodiments of the present invention, it is assumed that the ink is a liquid. Alternatively, the present invention may employ an ink which is solid at room temperature or less and softens or liquefies at room temperature or an ink which liquefies upon application of a use printing signal, since it is a general practice to perform temperature control of the ink itself within a range from 30° C. to 70° C. in the ink-jet system, so that the ink viscosity can fall within a stable discharge range.

In addition, in order to prevent a temperature rise caused by heat energy by positively utilizing it as energy for causing a change in state of the ink from a solid state to a liquid state, or to prevent evaporation of the ink, an ink which is solid in a non-use state and liquefies upon heating may be used. In any case, an ink which liquefies upon application of heat energy according to a printing signal and is discharged in a liquid state, an ink which begins to solidify when it reaches a printing medium, or the like, is applicable to the present invention. In this case, an ink may be situated opposite electrothermal transducers which being heated in a liquid or solid state in recess portions of a porous sheet or through holes, as described in Japanese Patent Laid-Open No. 54-56847 or 60-71260. In the present invention, the above-mentioned film boiling system is most effective for the above-mentioned inks.

In addition, the printer of the present invention may be used in the form of a copying machine combined with a reader, and the like, or a facsimile apparatus having a transmission/reception function in addition to a printer integrally or separately mounted as an image output terminal of information processing equipment such as a computer.

Other Embodiment

The present invention can be applied to a system constituted by a plurality of devices (e.g., host computer, interface, reader, printer) or to an apparatus comprising a signal device (e.g., copying machine, facsimile machine).

Further, the object of the present invention can also be achieved by providing a storage medium (or recording medium) storing program codes for implementing the aforesaid function of the above embodiments to a system or apparatus, reading the program codes, by a computer (CPU or MPU) of the system or apparatus, from the storage medium, then executing the program. In this case, the program codes read from the storage medium realize the functions according to the embodiments, and storage medium storing the program codes constitutes the invention. Furthermore, besides the aforesaid functions according to the above embodiment being realized by executing program codes which are read by a computer, the present invention includes a case where an OS (operating system) or the like working on the computer performs a part or entire processes in accordance with designations of the program codes and realizes functions according to the above embodiments.

Furthermore, the present invention also includes a case where, after the program codes read from the storage medium are written in a function expansion card which is inserted into the computer or in a memory provided in a function expansion unit which is connected to the computer, CPU or the like contained in the function expansion card or unit performs a part or entire process in accordance with designations of the program codes and realizes functions of the above embodiments.

When the present invention is to be applied to the above storage medium, program codes corresponding to the flow chart of FIG. 7 described above and various tables are stored in the storage medium.

As described above, by using tables like those in the embodiments, image characteristics can be arbitrarily controlled. As described in each embodiment, in particular, the frequency of occurrence of each ink with respect to a change in CD value can be controlled. That is, by gradually changing the frequency of occurrence of each ink (particularly, ink having a high density) with a change in CD value, an image without any pseudo contour can be obtained even in the presence of an error between a desired OD value and a printing OD value.

In error diffusion processing as well, the frequency of occurrence of each ink can be changed to a certain degree with a change in CD value by changing coefficients for diffusion. However, the frequency of occurrence of each ink cannot be finely and freely set with respect to all CD values unlike the embodiments.

In error diffusion, calculations are required in error diffusion processing. However, in the embodiments, since only tables are looked up, the processing time can be shortened. If the number of gray levels that can be expressed by each pixel (600 dpi) is the same as in error diffusion, a smoother image can be obtained by error diffusion. In the embodiments, however, as described above, since the processing time can be shortened, the number of gray levels that can be expressed can be increased accordingly. For example, according to Japanese Patent Laid-Open No. 10-324002, six types of halftone inks are used, and about 50 different densities can be expressed by each pixel. In the embodiments, eight multi-density inks are used, and the number of gray levels that can be expressed by each pixel (600 dpi) is 256. As a consequence, 1,000 gray levels can be expressed on a 2×2 pixel (300 dpi) basis, and 4,000 gray levels can be expressed on a 4×4 pixel (150 dpi) basis. When a chest X-ray image was actually printed by this method, pseudocontours were reduced.

The present invention is not limited to the above embodiments and various changes and modifications can be made within the spirit and scope of the present invention. Therefore, to apprise the public of the scope of the present invention the following claims are made.

What is claimed is:

1. A printing apparatus for supplying printing materials from a printhead, which is used to supply a plurality of types of printing materials having the same color and different densities on the basis of density information values obtained from image data, onto each of a plurality of pixels to print an image including the plurality of pixels, expressed by combinations of the plurality of types of printing materials on a printing medium, said printing apparatus comprising:

a data storage unit storing data made to correspond to combination information representing a combination of the printing materials with respect to each address information representing a position of each of the plurality of pixels, for the respective density information values;

acquisition means for acquiring combination information of printing materials to be used to print a target pixel by looking up data stored in said data storage unit on the basis of a density information value and address information of the target pixel; and printing control means for printing the target pixel by supplying printing materials from the printhead onto the target pixel on the basis of the combination information acquired by said acquisition means, wherein the data corresponding to a given density information value of the density information values include different combination information representing plural different combinations of the printing materials.

2. The apparatus according to claim 1, wherein the density information value is a gray level obtained by converting the image data into grayscale data.

3. The apparatus according to claim 1, wherein the density information value is a printing density value of a printing material printed on the printing medium, and the printing density value corresponds to a gray level obtained by converting the image data into grayscale data.

4. The apparatus according to claim 1, wherein each item of address information in data stored in said state storage unit corresponds to address information of a respective pixel in each block if the pixel data is divided into a plurality of blocks each constituted by a predetermined number of pixels, and said acquisition means acquires combination information of printing materials to be used to print a target pixel by looking up the data stored in said data storage unit on the basis of a density information value of the target pixel and address information of the target pixel in a block to which the target pixel belongs.

5. The apparatus according to claim 4, wherein, in the data stored in said data storage unit, a combination of the printing materials corresponding to each address in one block constituted by only a plurality of pixels having the same density information value is determined such that a printing density value of the block becomes an average printing density of the respective pixels in the block.

6. The apparatus according to claim 4, wherein, in the data stored in said data storage unit, a combination of the printing materials corresponding to each address in the block is determined such that as an address value in the block increases, a printing density value of a pixel corresponding to the address sequentially decreases or remains the same.

7. The apparatus according to claim 4, wherein two pixels having consecutive addresses are arranged not to be adjacent to each other in the block.

8. The apparatus according to claim 1, wherein the printing medium is a transparent medium in which an additive property holds, and wherein the data stored in said data storage unit are suitable for use in effecting a reproduction of an image on that transparent medium.

9. The apparatus according to claim 1, wherein the image data is input image data input from an external device to the printing apparatus, and the external device comprises at least one of an X-ray photography apparatus, an X-ray CT scanner, and an MRI apparatus.

10. The apparatus according to claim 1, wherein the image data comprises medical image data input from a medical image input apparatus as an external device to the printing apparatus.

11. The apparatus according to claim 1, wherein the printing material comprises black ink.

12. The apparatus according to claim 1, wherein a color printed by the printing material is an achromatic color.

13. The apparatus according to claim 1, wherein the printhead comprises an ink-jet printhead for discharging ink.

14. The apparatus according to claim 13, wherein said ink-jet printhead is a head for discharging ink by using heat energy and comprises a heat energy converter for generating heat energy to be supplied to the ink.

15. A printing method of supplying printing materials from a printhead, which is used to supply a plurality of types of printing materials having the same color and different densities on the basis of density information values obtained from image data, onto each of a plurality of pixels to print an image including the plurality of pixels, expressed by combinations of the plurality of types of printing materials on a printing medium, said method comprising the steps of:

an acquisition step, of looking up data in a data storage unit storing data made to correspond to combination information representing a combination of the printing materials with respect to each address information representing a position of each of the plurality of pixels, for the respective density information values, to acquire combination information of printing materials to be used to print a target pixel on the basis of a density information value and address information of the target pixel; and a printing control step, of printing the target pixel by supplying printing materials from the printhead onto the target pixel on the basis of the combination information acquired in said acquisition step, wherein the data corresponding to a given density information value of the density information values include different combination information representing plural different combinations of the printing materials.

16. The method according to claim 15, wherein the density information value is a gray level obtained by converting the image data into grayscale data.

17. The method according to claim 15, wherein the density information value is a printing density value of a printing material printed on the printing medium, and the printing density value corresponds to a gray level obtained by converting the image data into grayscale data.

18. The method according to claim 15, wherein each item of address information in data stored in the state storage unit corresponds to address information of a respective pixel in each block if the pixel data is divided into a plurality of blocks each constituted by a predetermined number of pixels, and in the acquisition step, combination information of printing materials to be used to print a target pixel is acquired by looking up the data stored in the data storage unit on the basis of a density information value of the target pixel and address information of the target pixel in a block to which the target pixel belongs.

19. The method according to claim 18, wherein, in the data stored in the data storage unit, a combination of the printing materials corresponding to each address in one block constituted by only a plurality of pixels having the same density information value is determined such that a printing density value of the block becomes an average printing density of the respective pixels in the block.

20. The method according to claim 18, wherein, in the data stored in the data storage unit, a combination of the printing materials corresponding to each address in the block is determined such that as an address value in the block increases, a printing density value of a pixel corresponding to the address sequentially decreases or remains the same.

21. The method according to claim 18, wherein two pixels having consecutive addresses are arranged not to be adjacent to each other in the block.

22. The method according to claim 15, wherein the printing medium is a transparent medium in which an additive property holds.

23. The method according to claim 15, wherein the image data is input image data input from an external device to the printing method, and the external device comprises at least one of an X-ray photography method, an X-ray CT scanner, and an MRI method.

24. The method according to claim 15, wherein the image data comprises medical image data input from a medical image input method as an external device to the printing method.

25. The method according to claim 15, wherein the printing material comprises black ink.

26. The method according to claim 15, wherein a color printed by the printing material is an achromatic color.

27. The method according to claim 15, wherein the printhead comprises an ink-jet printhead for discharging ink.

28. The method according to claim 27, wherein the ink-jet printhead is a head for discharging ink by using heat energy and comprises a heat energy converter for generating heat energy to be supplied to the ink.

29. A computer-readable storage medium storing a program for controlling a printing apparatus for supplying printing materials from a printhead, which is used to supply a plurality of types of printing materials having the same color and different densities on the basis of density information values obtained from image data, onto each of a plurality of pixels to print an image including the plurality of pixels, expressed by combinations of the plurality of types of printing materials on a printing medium, the program comprising the steps of:

an acquisition step, of looking up data in a data storage unit storing data made to correspond to combination information representing a combination of the printing materials with respect to each address information representing a position of each of the plurality of pixels, for the respective density information values, to acquire combination information of printing materials to be used to print a target pixel on the basis of a density information value and address information of the target pixel; and a generating step, of generating a binary signal corresponding to the ink to be discharged onto the target pixel, on the basis of the combination information acquired in said acquisition step, wherein the data corresponding to a given density information value of the density information values include different combination information representing plural different combinations of the printing materials.

30. A program for controlling a printing apparatus for supplying printing materials from a printhead, which is used to supply a plurality of types of printing materials having the same color and different densities on the basis of density information values obtained from image data, onto each of a plurality of pixels to print an image including the plurality of pixels expressed by combinations of the plurality of types of printing materials on a printing medium, the program comprising the steps of:

an acquisition step, of looking up data in a data storage unit storing data made to correspond to combination information representing a combination of the printing materials with respect to each address information representing a position of each of the plurality of pixels, for the respective density information values, to acquire combination information of printing materials to be used to print a target pixel on the basis of a density information value and address information of the target pixel; and a generating step, of generating a binary signal corresponding to the ink to be discharged onto the target pixel, on the basis of the combination information acquired in the acquisition step, wherein the data corresponding to a given density information value of the density information values include different combination information representing plural different combinations of the printing materials.

* * * * *

UNITED STATES PATENT AND TRADEMARK OFFICE
CERTIFICATE OF CORRECTION

PATENT NO. : 6,739,772 B2
DATED : May 25, 2004
INVENTOR(S) : Kenichi Suzuki et al.

Page 1 of 1

It is certified that error appears in the above-identified patent and that said Letters Patent is hereby corrected as shown below:

Title page,
Item [56], References Cited, FOREIGN PATENT DOCUMENTS,
"JP   10324002   12/1998" should read -- JP    10-324002   12/1998 --.

Column 13,
Line 3, "$DA1 \leq DA2 \leq DA3 \leq ... \leq DAa$." should read -- $DA1 \geq DA2 \geq DA3 \geq ... \geq DAa$. --

Signed and Sealed this

Twenty-eighth Day of June, 2005

JON W. DUDAS
*Director of the United States Patent and Trademark Office*